United States Patent
Werner

(10) Patent No.: US 10,030,605 B2
(45) Date of Patent: Jul. 24, 2018

(54) SELF-SEALING APPARATUS THAT ADJUSTS A THROAT AREA OF A NOZZLE

(71) Applicant: The Boeing Company, Chicago, IL (US)

(72) Inventor: Eric L. Werner, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 14/796,556

(22) Filed: Jul. 10, 2015

(65) Prior Publication Data

US 2015/0315999 A1     Nov. 5, 2015

Related U.S. Application Data

(63) Continuation-in-part of application No. 13/370,206, filed on Feb. 9, 2012, now Pat. No. 9,341,140.

(51) Int. Cl.
*F02K 1/00* (2006.01)
*F02K 1/10* (2006.01)
*F02K 1/15* (2006.01)
*F02K 1/12* (2006.01)

(52) U.S. Cl.
CPC ........... *F02K 1/10* (2013.01); *F02K 1/12* (2013.01); *F02K 1/15* (2013.01)

(58) Field of Classification Search
CPC .............. F02K 1/10; F02K 1/12; F02K 1/15
See application file for complete search history.

(56) References Cited

U.S. PATENT DOCUMENTS

| 2,625,008 A | 1/1953 | Crook |
| 2,939,274 A | 6/1960 | Olson |
| 5,141,154 A | 8/1992 | Barcza |
| 5,294,055 A | 3/1994 | Garrett et al. |
| 6,910,328 B1 * | 6/2005 | Joyce ............ F02K 1/004 239/265.19 |
| 2010/0327078 A1 | 12/2010 | Baker et al. |
| 2013/0206858 A1 | 8/2013 | Werner |

FOREIGN PATENT DOCUMENTS

EP      2626541      8/2013

OTHER PUBLICATIONS

European Search Report dated Jan. 16, 2017 in co-pending European Patent Application No. 16167754.7.

* cited by examiner

*Primary Examiner* — Richard Chang
(74) *Attorney, Agent, or Firm* — Joseph M. Rolnicki; Evans & Dixon, L.L.C.

(57) ABSTRACT

A flow control panel in an aircraft engine two-dimensional, convergent/divergent nozzle adjusts a throat area of the nozzle and is configured to be self-sealing, thereby requiring fewer parts and providing a more simplified construction of the throat area of the nozzle.

20 Claims, 22 Drawing Sheets

US 10,030,605 B2

SELF-SEALING APPARATUS THAT ADJUSTS A THROAT AREA OF A NOZZLE

This application is a continuation-in-part of patent application Ser. No. 13/370,206, which was filed on Feb. 9, 2012 and is currently pending.

FIELD

Embodiments of the present disclosure relate generally to fluid-dynamic design. More particularly, embodiments of the present disclosure relate to design of fluid-dynamic control surfaces.

BACKGROUND

Supersonic vehicles that utilize engines with afterburners to augment thrust generally require a mechanism to change flow area in a throat section of a nozzle of the engine. Current throat area control systems in 2D convergent-divergent nozzles typically rely on translation of a mechanism or rotation of a mechanism around an axis perpendicular to a flow through the flow area. As a result, edges or hinge lines perpendicular to the exhaust airflow and planform of the vehicle are introduced. Edges or hinge lines are undesirable features for survivability in advanced aircraft designs. Furthermore, orienting the edges of the current mechanisms to be angular to the airflow results in gaps requiring very complicated sealing techniques, making them infeasible for use.

SUMMARY

A variable area mechanism and methods are disclosed. A movable flow area control surface comprising a specially contoured interface surface is operable to rotate about an off-body axis-of-rotation such that the movable flow area control surface expands from and retracts into an angle notched nozzle surface without opening asymmetric gaps due to the specially contoured interface surface.

Supersonic vehicles that utilize engines with afterburners to augment thrust require a mechanism to change flow area in a throat section of a nozzle. The variable area mechanism with angular trailing edges described herein does so in a manner that is simple, requires a minimal amount of sealing at interfaces from hot exhaust gases, and maintains angular trailing edges for improved survivability.

In an embodiment, a variable area mechanism comprises a movable surface comprising a contoured interface surface. The movable surface is operable to rotate about an off-body axis-of-rotation such that the movable surface expands from and retracts into an angle notched surface.

In another embodiment, a method for varying a cross-sectional area of an enclosed volume rotates a movable flow area control surface comprising a contoured interface surface about an off-body axis-of-rotation such that the movable flow area control surface expands from and retracts into an angle notched surface.

In a further embodiment, a method for providing a variable area mechanism provides a movable flow area control surface comprising a contoured interface surface. The method further couples the movable flow area control surface to an off-body-axis rotation-system operable to rotate the movable surface around the off-body axis-of-rotation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, nozzle design, vehicle structures, fluid dynamics, flight control systems, engines, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft engine nozzle. Embodiments of the disclosure, however, are not limited to such aircraft engine nozzle applications, and the techniques described herein may also be utilized in other applications. For example but without limitation, embodiments may be applicable to tubes, pipes, automobile engines, or other fluid dynamic surface and/or enclosed volume.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
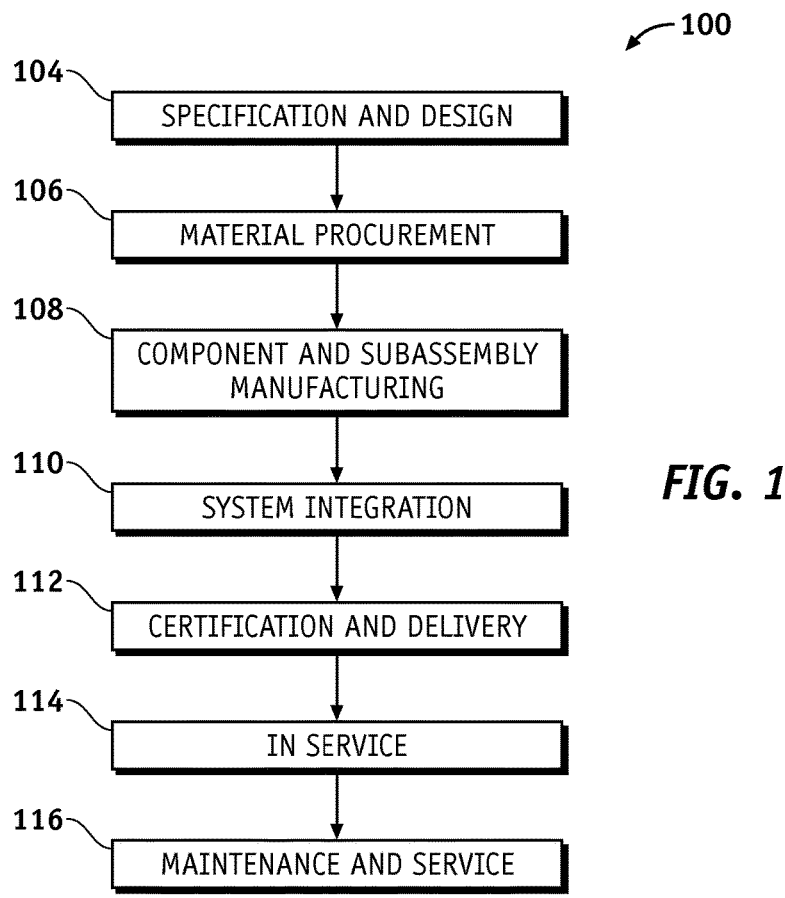
FIG. 1 is an illustration of a flow diagram of an exemplary aircraft production and service methodology.
Figure 2:
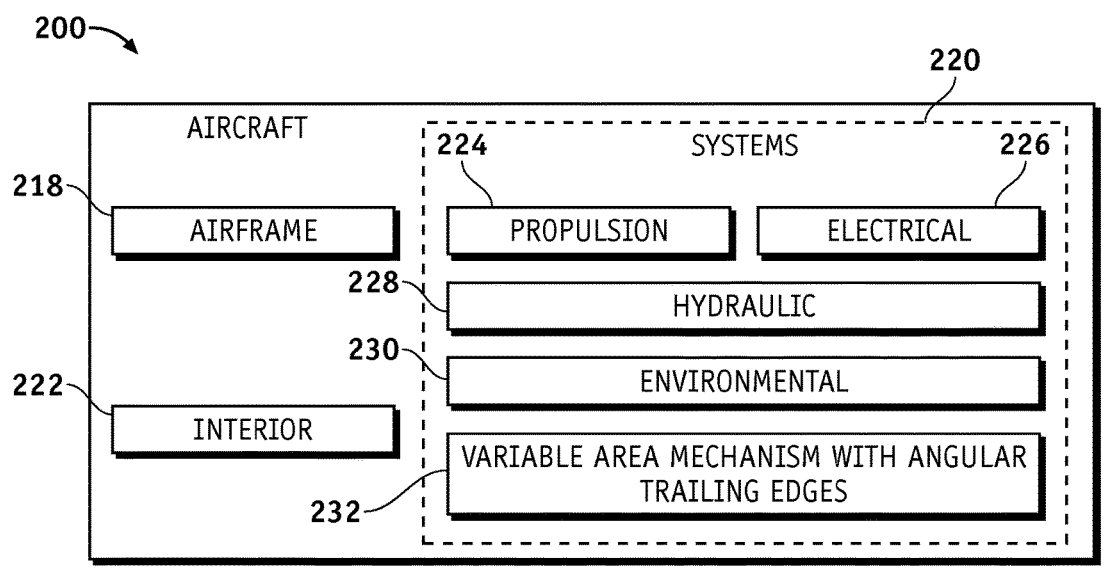
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a variable area mechanism with angular trailing edges 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Supersonic vehicles that utilize engines with afterburners to augment thrust require a mechanism to change flow area in the throat section of the nozzle. The variable area mechanism with angular trailing edges described herein does so in a manner that is simple, requires a minimal amount of sealing at interfaces from the hot exhaust gases, and most importantly maintains angular trailing edges for improved survivability.

Existing solutions generally utilize ramp systems that may be extremely difficult or impossible to implement when hinges, gaps and interfaces need to be oriented at an angle relative to a flow direction.

When an axis of rotation is perpendicular to edges of a mechanism and flow direction, the mechanism should rotate to change area without opening asymmetric gaps, as gaps need to be sealed in a nozzle from a hot gas environment. If the edges of the mechanism need to be angled relative to the flow for design considerations, simple rotation along a perpendicular axis may cause asymmetric gaps opening as the mechanism is rotated. These gaps are very undesirable, and may make this type of mechanism not feasible for use.

In contrast, embodiments of the discloser utilize a rotation around an axis above and aft of a trailing edge of the mechanism, coupled with an appropriately contoured interface surface, to expand from and retract into a floor of the nozzle to change a throat area while maintaining angular trailing edges at an angle to the flow direction without opening the gaps.

Figure 3:
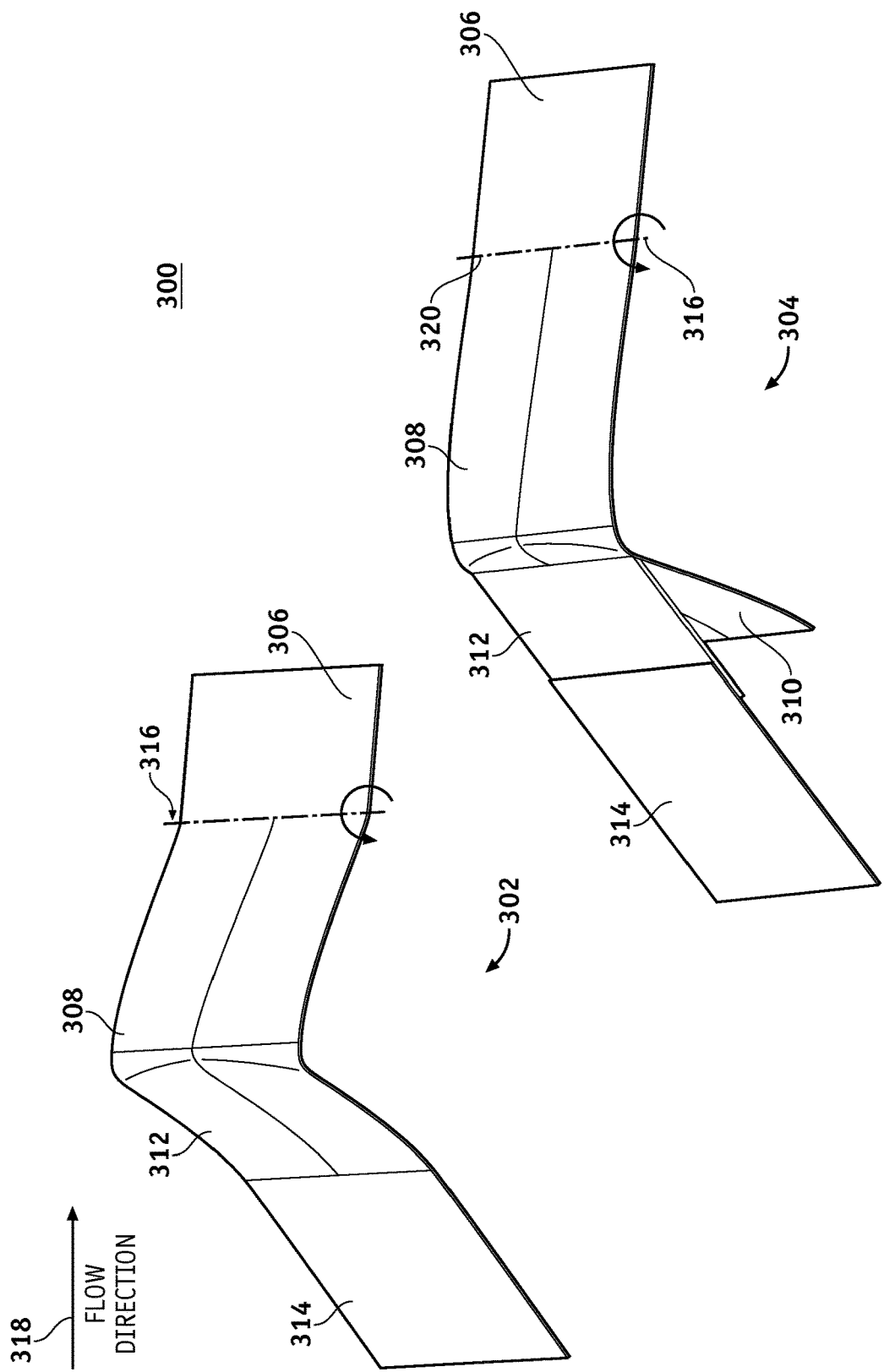
FIG. 3 is an illustration of a typical current nozzle throat control system showing side views thereof at a minimum throat area position and at a maximum throat area position, the nozzle throat control system is translated or rotated around an axis perpendicular relative to edges thereof and relative to a flow direction, movement occurs without opening any gap at a trailing edge.

FIG. 3 is an illustration of a typical current nozzle throat control system 300 (system 300) showing side views thereof at a minimum throat area position 302 and at a maximum throat area position 304. When the nozzle throat control system is translated or rotated around an axis of rotation 316 perpendicular relative to edges thereof and relative to a flow direction 318, movement occurs without opening a gap at a trailing edge 320. The nozzle throat control system 300 comprises a nozzle surface 306, a movable surface 308, a forward angle side 310, a slide interface 312, and a forward flow panel 314. Current throat area control systems such as the system 300 rely on translation or rotation around the axis of rotation 316 perpendicular to the flow direction 318. When the edges of the system 300 are perpendicular to the axis of rotation 316, the system 300 can rotate to change area without opening asymmetric gaps. Gaps need to be sealed in a nozzle from a hot gas environment. Sealing gaps in the nozzle may be very complicated.

Figure 4:
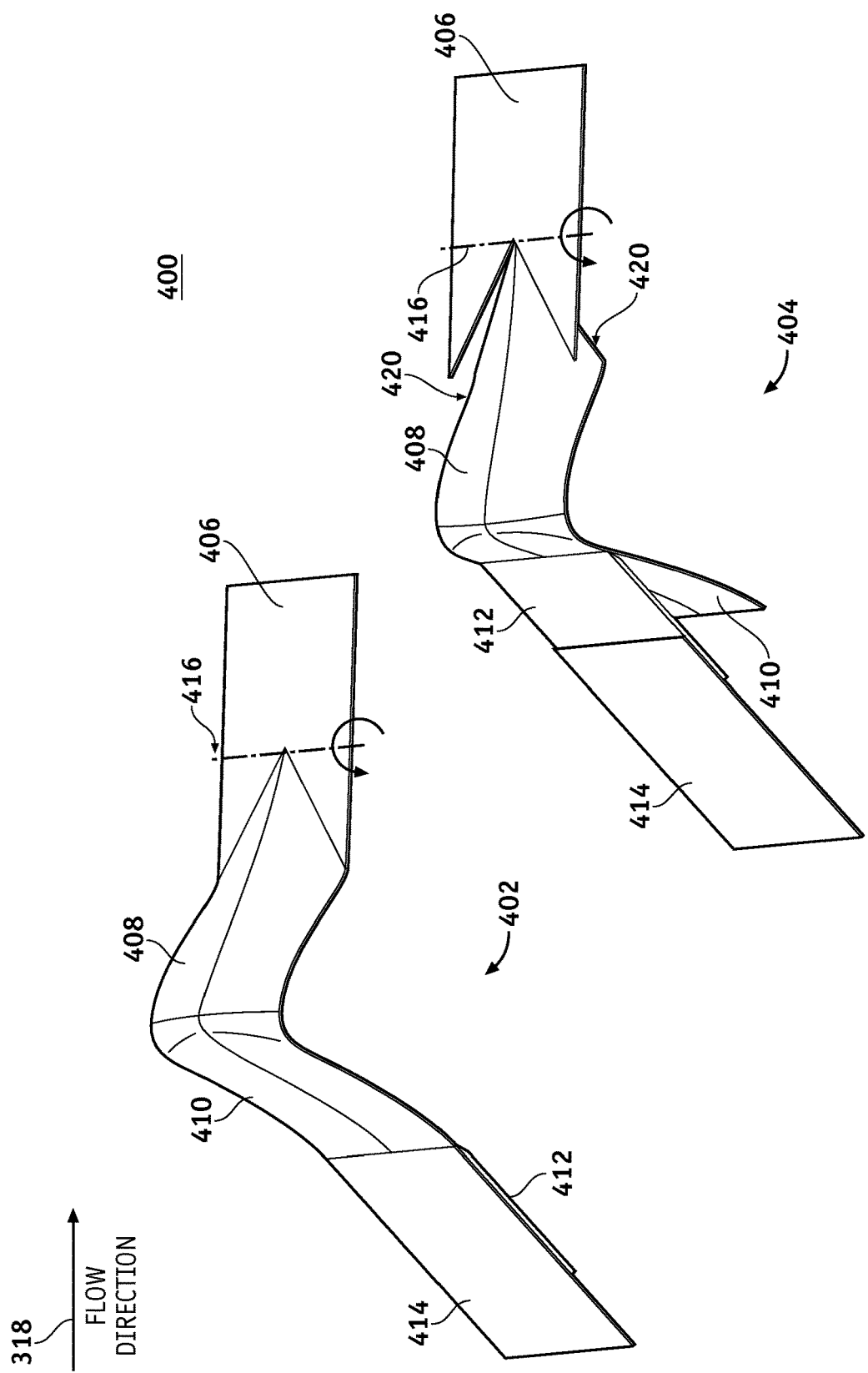
FIG. 4 is an illustration of a nozzle throat control system showing side views thereof at a minimum throat area position and at a maximum throat area position when the nozzle throat control system is translated or rotated around an axis at an angle relative to edges thereof and perpendicular relative to a flow direction, thereby opening asymmetric gaps.

FIG. 4 is an illustration of a nozzle throat control system 400 (system 400) showing side views thereof at a minimum throat area position 402 and at a maximum throat area position 404 when the nozzle throat control system 400 is translated or rotated around a rotation axis 416 relative to edges of the system 400 and perpendicular relative to the flow direction 318, thereby opening asymmetric gaps 420. The gaps may be difficult or impossible to seal, and therefore this configuration may be infeasible. The nozzle throat control system 400 comprises a notched nozzle surface 406, a movable surface 408, a forward angle side 410, a slide interface 412, and a forward flow panel 414.

If the edges of the system 400 need to be angled relative to the flow direction 318 for design considerations, simple rotation around the rotation axis 416 perpendicular to the flow direction 318 can open asymmetric gaps 420. Gaps need to be sealed in a nozzle from a hot gas environment. The gaps may be difficult or impossible to seal, and therefore this configuration may be infeasible. Thereby, the system 400 may not be feasible for use.

Figure 5:
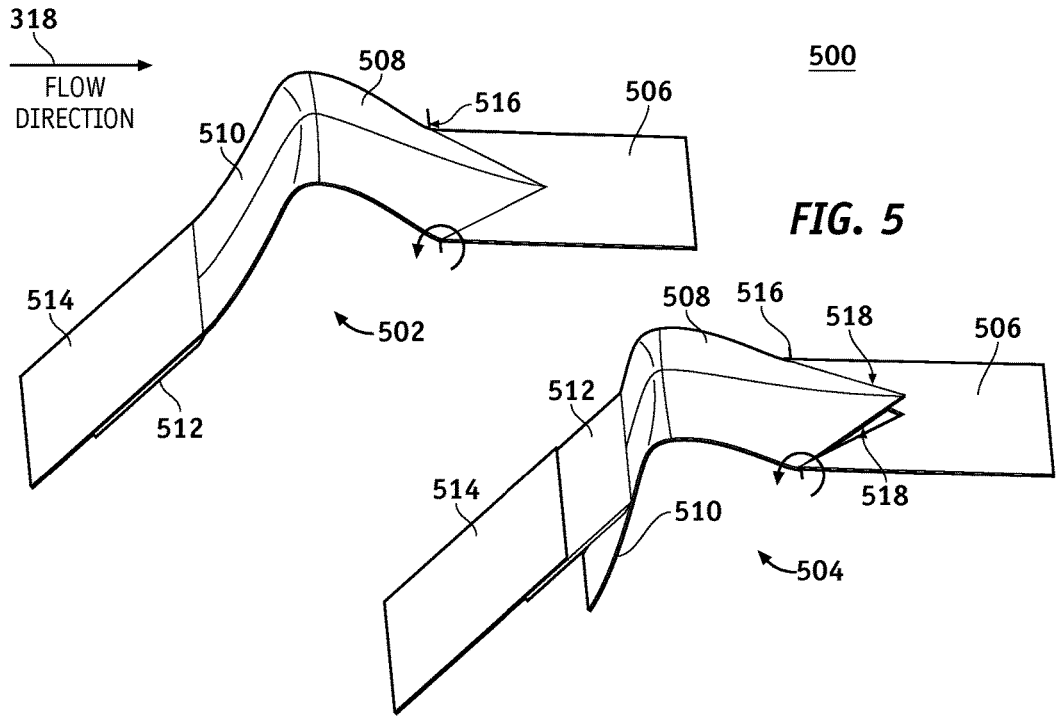
FIG. 5 is an illustration of a nozzle throat control system showing side views thereof at a minimum throat area position and at a maximum throat area position when the nozzle throat control system is translated or rotated around a different axis, than the axis in FIG. 4, at an angle relative to edges thereof and perpendicular relative to the flow direction also opening asymmetric gaps.

FIG. 5 is an illustration of a nozzle throat control system 500 (system 500) showing side views thereof at a minimum throat area position 502 and at a maximum throat area position 504 when the nozzle throat control system 500 is translated or rotated around a rotation axis 516 (e.g., that is different than the rotation axis 416 in FIG. 4) at an angle relative to the flow direction 318 also opening asymmetric gaps 518. The nozzle throat control system 500 comprises a notch nozzle surface 506, a movable surface 508, a forward angle side 510, a slide interface 512, and a forward flow panel 514.

Comparing FIGS. 4 and 5 shows that moving the rotation axis 416 to the rotation axis 516 does not solve the problem of opening gaps. Moving the rotation axis 416 just opens up asymmetric gaps such as the asymmetric gaps 518 in a different place. Gaps need to be sealed in a nozzle from a hot gas environment. The gaps would be difficult or impossible to seal, and therefore this design may be infeasible. Thereby, the system 500 may not be feasible for use.

Figure 6:
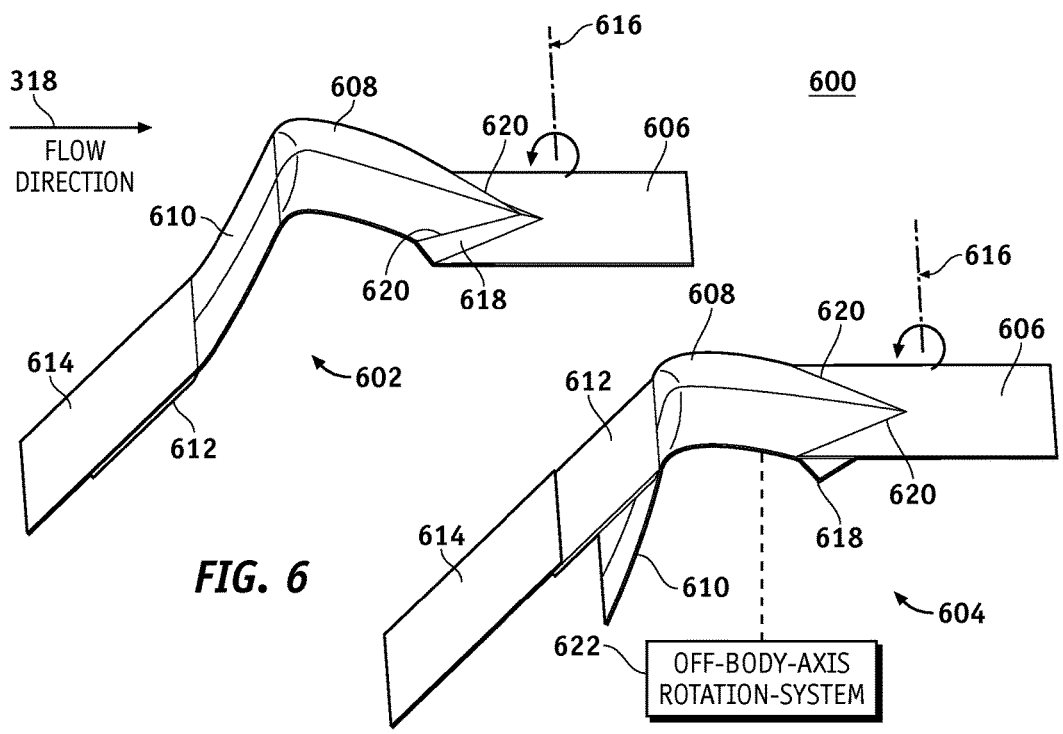
FIG. 6 is an illustration of an exemplary nozzle throat control system showing side views thereof at a minimum throat area position and at a maximum throat area position when the nozzle throat control system is rotated around an off-body axis-of-rotation at an angle relative to edges thereof and relative to a flow direction without opening asymmetric gaps according to an embodiment of the disclosure.

FIG. 6 is an illustration of an exemplary nozzle throat control system 600 (system 600) showing side views thereof at a minimum throat area position 602 and at a maximum throat area position 604 when the nozzle throat control system 600 is rotated around an off-body axis-of-rotation 616 at an angle relative to angular trailing edges 620 thereof and perpendicular relative to a flow direction 318 without opening asymmetric gaps according to an embodiment of the disclosure.

The nozzle throat control system 600 comprises an angle notched nozzle surface 606 (angle notched surface 606), a movable flow area control surface 608 (movable surface 608), a forward angle side 610, a slide interface 612, a forward flow panel 614, a contoured interface surface 618, and an off-body-axis rotation-system 622. The system 600 utilizes the off-body axis-of-rotation 616 and a specially contoured interface surface 618 that can have the angular trailing edges 620 and rotate through the motion without opening gaps.

The movable surface 608 comprises the contoured interface surface 618 and is configured to rotate about the off-body axis-of-rotation 616 such that the movable surface 608 expands from and retracts into the angle notched nozzle surface 606. In one embodiment, the movable surface 608 is configured to throttle a fluid flow. The movable surface 608 further comprises a forward angle side 610.

The forward flow panel 614 comprises the slide interface 612 configured to interface with the forward angle side 610 to seal the asymmetric gaps 420 and 518 shown in FIGS. 4 and 5 respectively.

The system 600 allows a very desirable design feature of the angular trailing edges 620 to be present without introducing complexity through asymmetric gaps 420 and 518 shown in FIGS. 4 and 5 respectively.

The off-body-axis rotation-system 622 is coupled to the movable surface 608 and is configured to rotate the movable surface 608 about the off-body axis-of-rotation 616.

Figure 7:
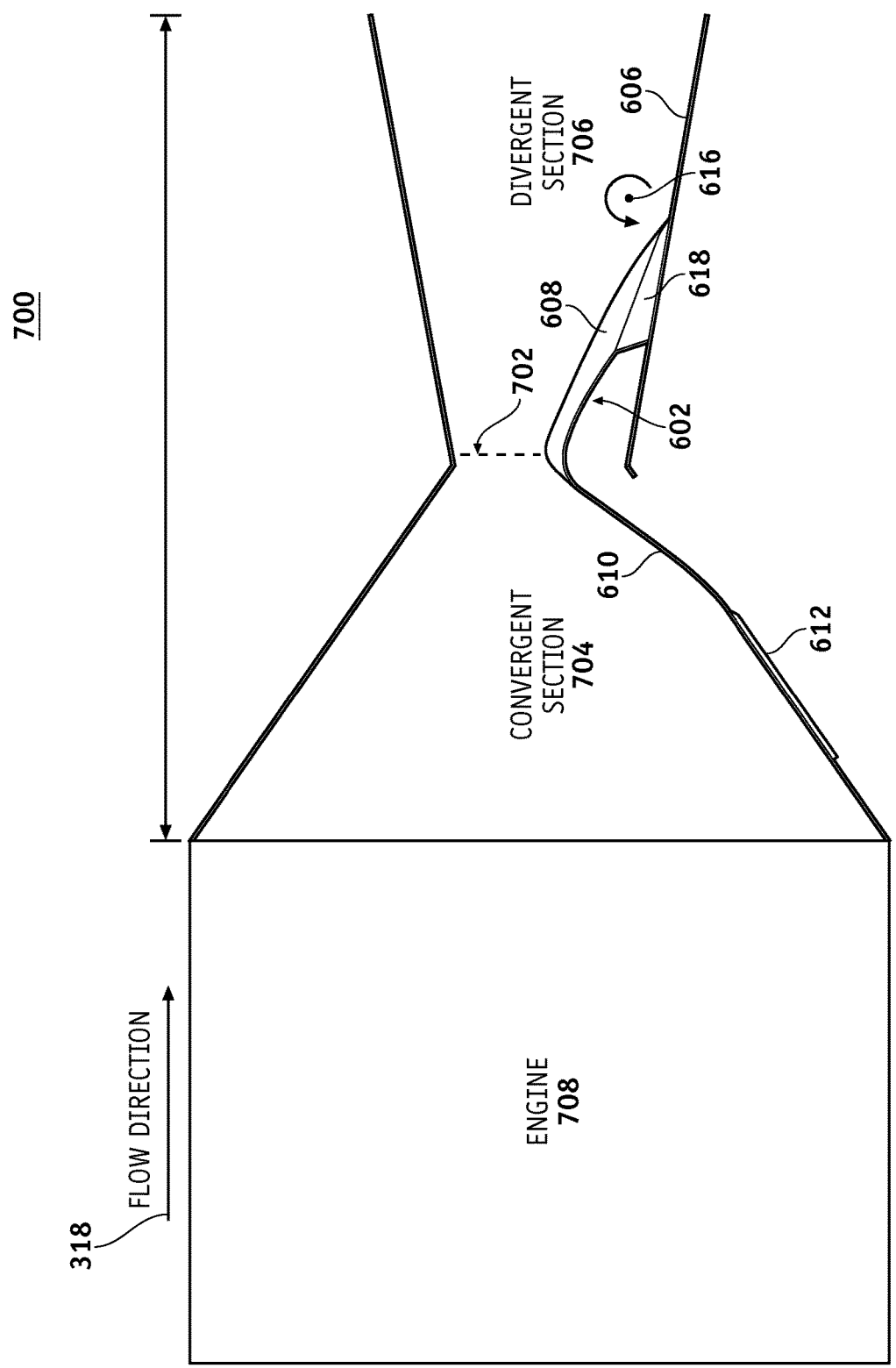
FIG. 7 is an illustration of a cross section of an exemplary convergent-divergent nozzle utilizing a nozzle throat control system according to an embodiment of the disclosure.

FIG. 7 is an illustration of a cross section of an exemplary convergent-divergent nozzle 700 (nozzle 700) utilizing a nozzle throat control system 600 at the minimum throat area position 602 (FIG. 6) according to an embodiment of the disclosure. The nozzle 700 comprises a convergent section 704 coupled to an engine 708, a throat area 702, and a divergent section 706. The nozzle throat control system 600 is located at the throat area 702 of the nozzle 700. The movable surface 608 rotates about the off-body axis-of-rotation 616 such that the throat area 702 of the nozzle 700 is changed.

The nozzle 700 is one example of an enclosing volume coupled to the nozzle throat control system 600. Other enclosing volumes can also be coupled to the nozzle throat control system 600. For example but without limitation, the enclosing volume may comprise a pipe, a pump, a hydraulic pump-jet, or other enclosing volume. In one embodiment, the enclosing volume comprises the angle notched nozzle surface 606.

Figure 8:
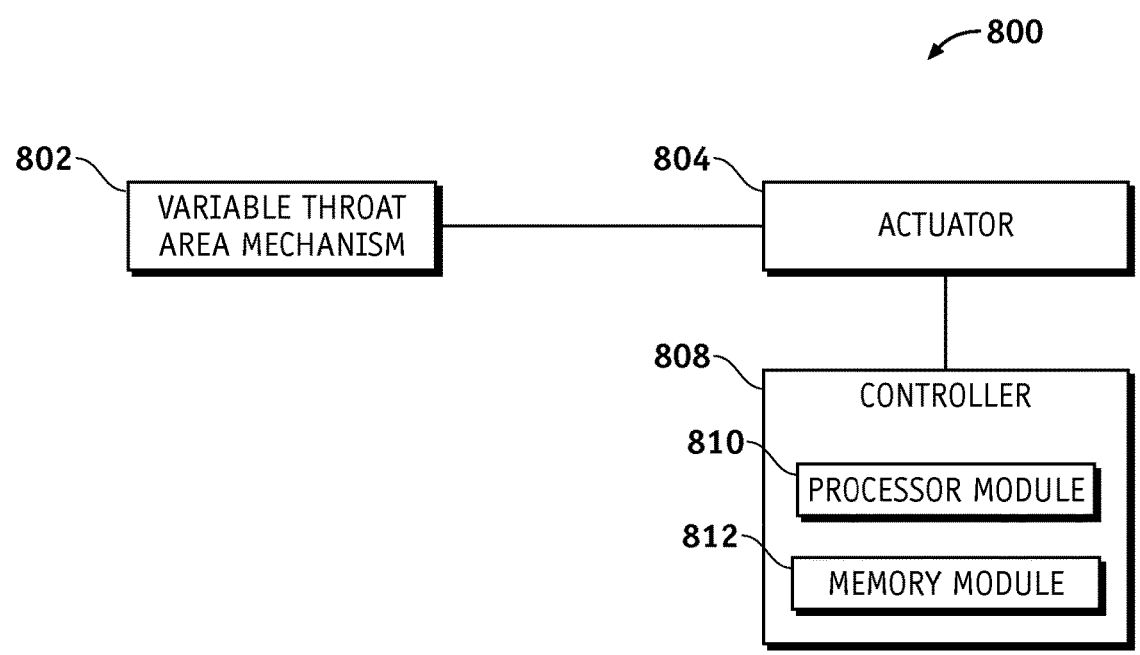
FIG. 8 is an illustration of an exemplary functional block diagram of a nozzle throat control system according to an embodiment of the disclosure.

FIG. 8 is an illustration of an exemplary functional block diagram of a nozzle throat control system 800 (system 800) according to an embodiment of the disclosure. The system 800 may comprise a variable throat area mechanism 802, an actuator 804, and a controller 808.

The actuator 804 is operable to vary a position (i.e., bend, deflect, change shape) of the movable surface 608 (FIG. 6) in response to an actuation command. In this manner, the movable surface 608 can change position to vary the throat area 702 of the nozzle 700. In one embodiment, the actuator 804 is controlled via a passive control mechanism to control the position of the movable surface 608 based on temperature corresponding to, for example, an altitude at a flight condition. In another embodiment, the controller 808 may include or be realized as a controller (connected to the aircraft systems), to facilitate controlling a position (i.e., changing the shape) of the movable surface 608.

Any actuator known to those skilled in the art may be used for actuation of the movable surface 608. For example but without limitation, a hydraulic actuator, a piezoelectric actuator, a spring loaded mechanism, a reverse flow blocking mechanism, a pyrotechnic actuator, a shape memory alloy actuator, or other actuator may be used.

The controller 808 may comprise, for example but without limitation, a processor module 810, a memory module 812, and other module. The controller 808 may be implemented as, for example but without limitation, a part of an aircraft system, a centralized aircraft processor, a subsystem computing module devoted to the variable throat area mechanism 802, or other implementation.

The controller 808 is configured to control the actuator 804 to vary a position of the movable surface 608 according to various operation conditions. The operation conditions may comprise, for example but without limitation, flight conditions, ground operations, or other condition. The flight conditions may comprise, for example but without limitation, take off, cruise, approach, landing, or other flight condition. The ground operations may comprise, for example but without limitation, air breaking after landing, or other ground operation. The controller 808, may be located remotely from the actuator 804, or may be coupled to the actuator 804.

The processor module 810 comprises processing logic that is configured to carry out the functions, techniques, and processing tasks associated with the operation of the system 800. In particular, the processing logic is configured to support the system 800 described herein. For example, the processor module 810 may direct the actuator 804 to vary a shape of the movable surface 608 based on various flight conditions.

The processor module 810 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 812 may comprise a data storage area with memory formatted to support the operation of the system 800. The memory module 812 is configured to store, maintain, and provide data as needed to support the functionality of the system 800. For example, the memory module 812 may store flight configuration data, control temperature data, actuator command signals, or other data.

In practical embodiments, the memory module 812 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 812 may be coupled to the processor module 810 and configured to store, for example but without limitation, a database, and the like. Additionally, the memory module 812 may represent a dynamically updating database containing a table for updating the database, and the like. The memory module 812 may also store, a computer program that is executed by the processor module 810, an operating system, an application program, tentative data used in executing a program, or other application.

The memory module 812 may be coupled to the processor module 810 such that the processor module 810 can read information from and write information to the memory module 812. For example, the processor module 810 may access the memory module 812 to access an aircraft speed, a flight control surface position, an angle of attack, a Mach number, an altitude, or other data.

As an example, the processor module 810 and memory module 812 may reside in respective application specific integrated circuits (ASICs). The memory module 812 may also be integrated into the processor module 810. In an embodiment, the memory module 812 may comprise a cache memory for storing temporary variables or other intermediate information during execution of instructions to be executed by the processor module 810.

Figure 9:
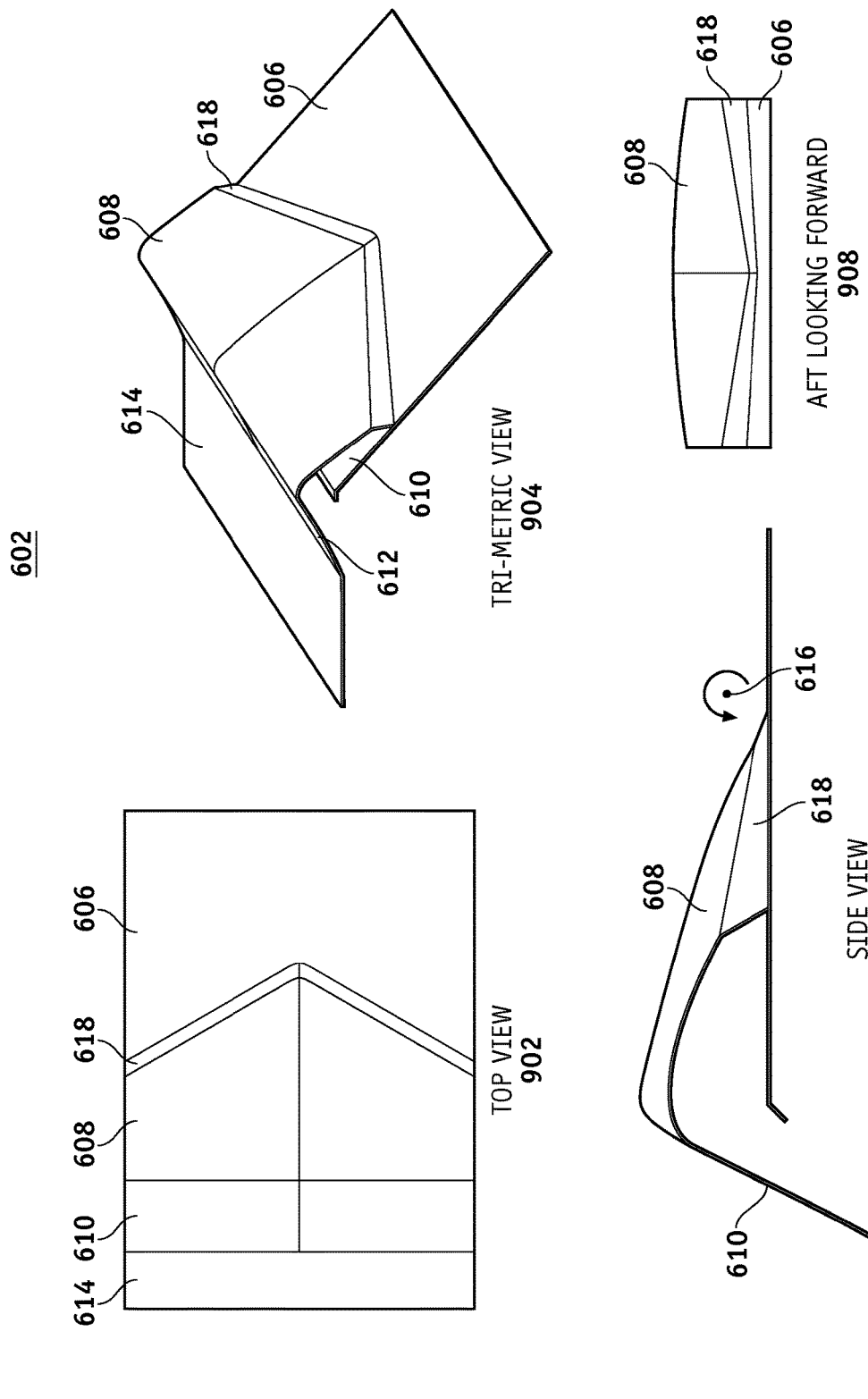
FIG. 9 is an illustration of a top view, a tri-metric view, a side view and an aft-looking-forward view of an exemplary nozzle throat control system at a minimum throat area position according to an embodiment of the disclosure.

FIG. 9 is an illustration of a top view 902, a tri-metric view 904, a side view 906 and an aft-looking-forward view 908 of the exemplary nozzle throat control system 600 at the minimum throat area position 602 (FIG. 6) according to an embodiment of the disclosure.

Figure 10:
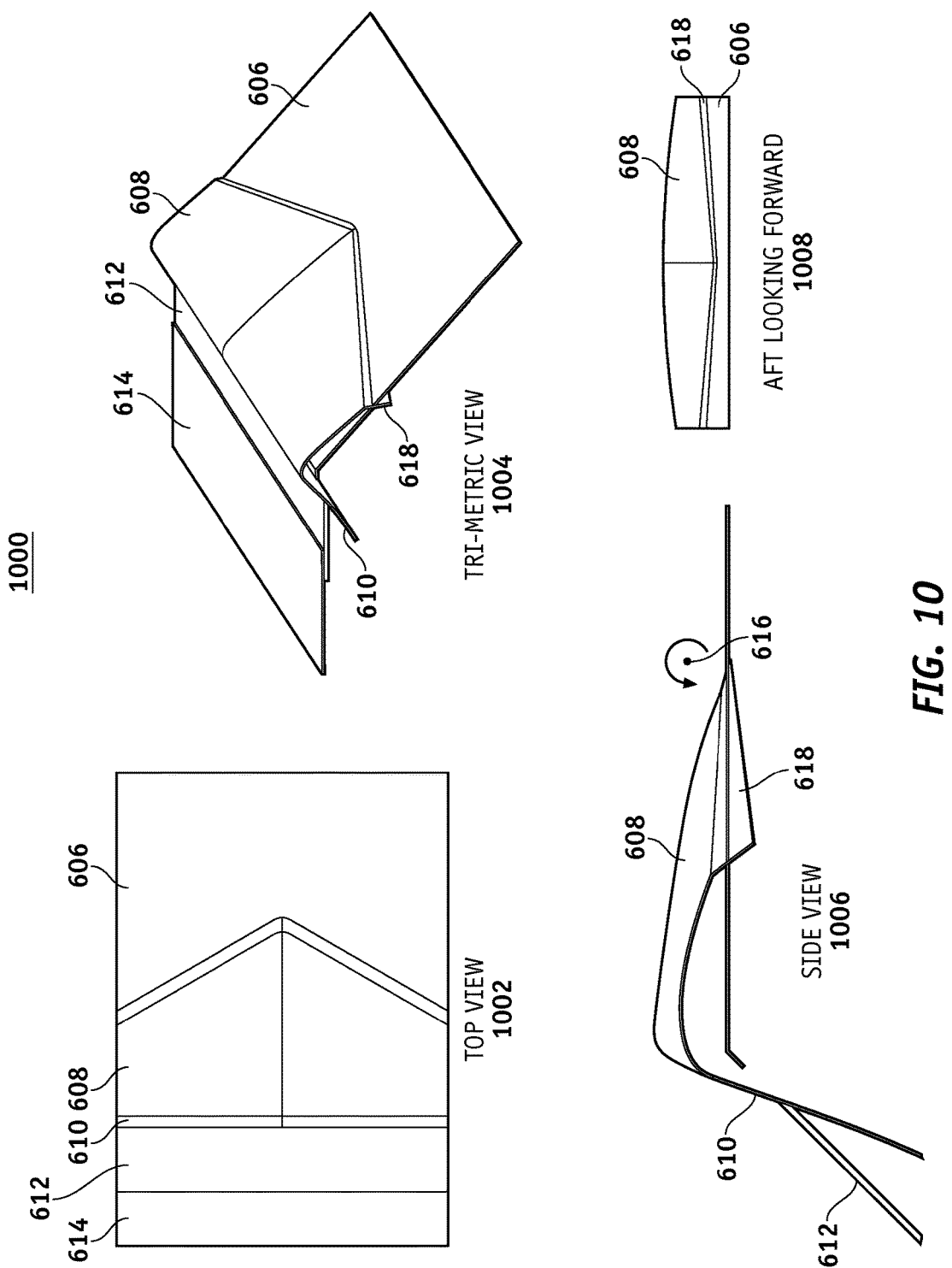
FIG. 10 is an illustration of a top view, a tri-metric view, a side view and an aft-looking-forward view of an exemplary nozzle throat control system at an intermediate throat area position according to an embodiment of the disclosure.

FIG. 10 is an illustration of a top view 1002, a tri-metric view 1004, a side view 1006 and an aft-looking-forward view 1008 of the exemplary nozzle throat control system 600 (FIG. 6) at an intermediate throat area position 1000 according to an embodiment of the disclosure.

Figure 11:
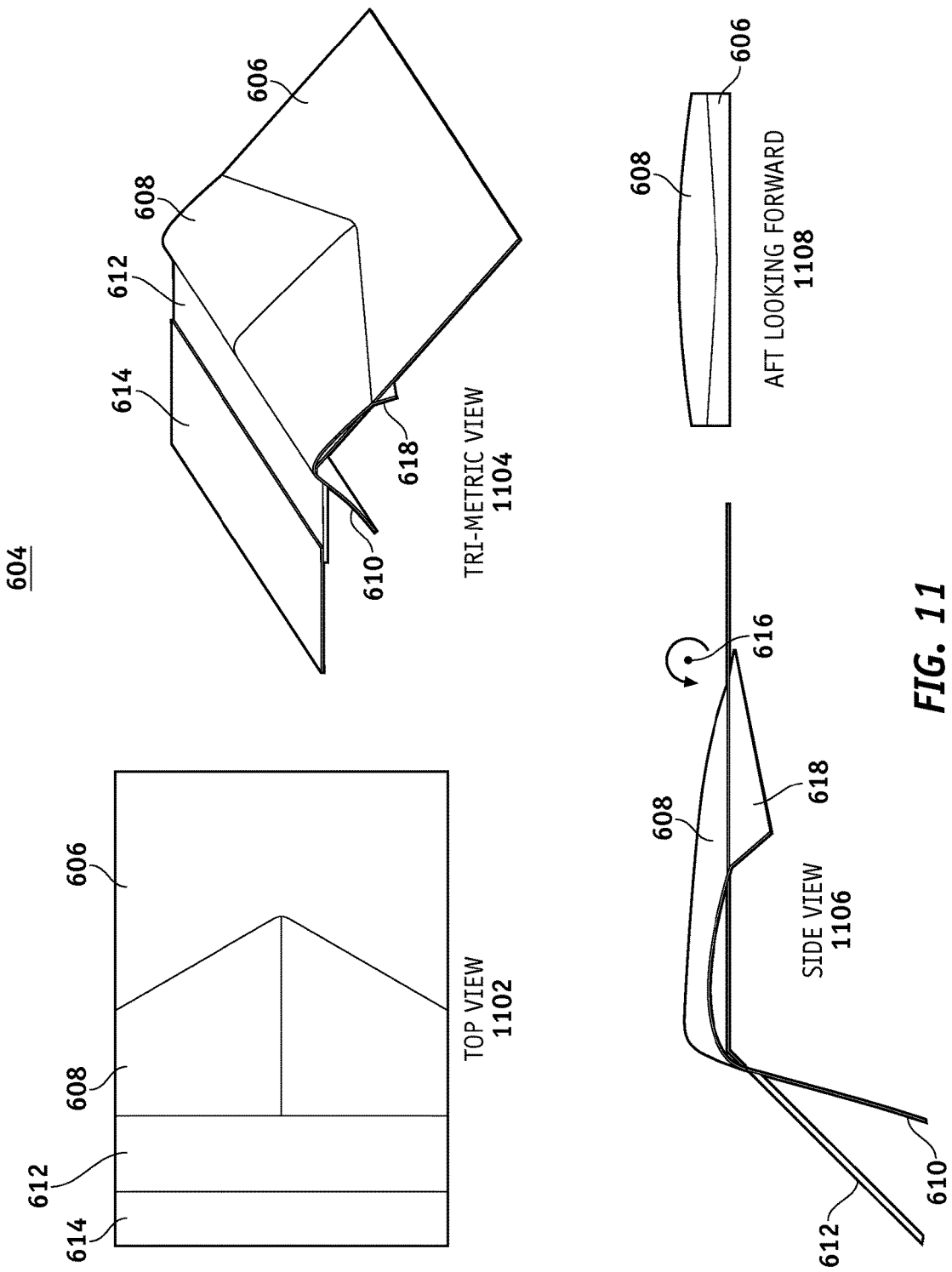
FIG. 11 is an illustration of a top view, a tri-metric view, a side view and an aft-looking-forward view of an exemplary nozzle throat control system at a maximum throat area position according to an embodiment of the disclosure.

FIG. 11 is an illustration of a top view 1102, a tri-metric view 1104, a side view 1106 and an aft-looking-forward view 1108 of the exemplary nozzle throat control system 600 at the maximum throat area position 604 (FIG. 6) according to an embodiment of the disclosure.

Figure 12:
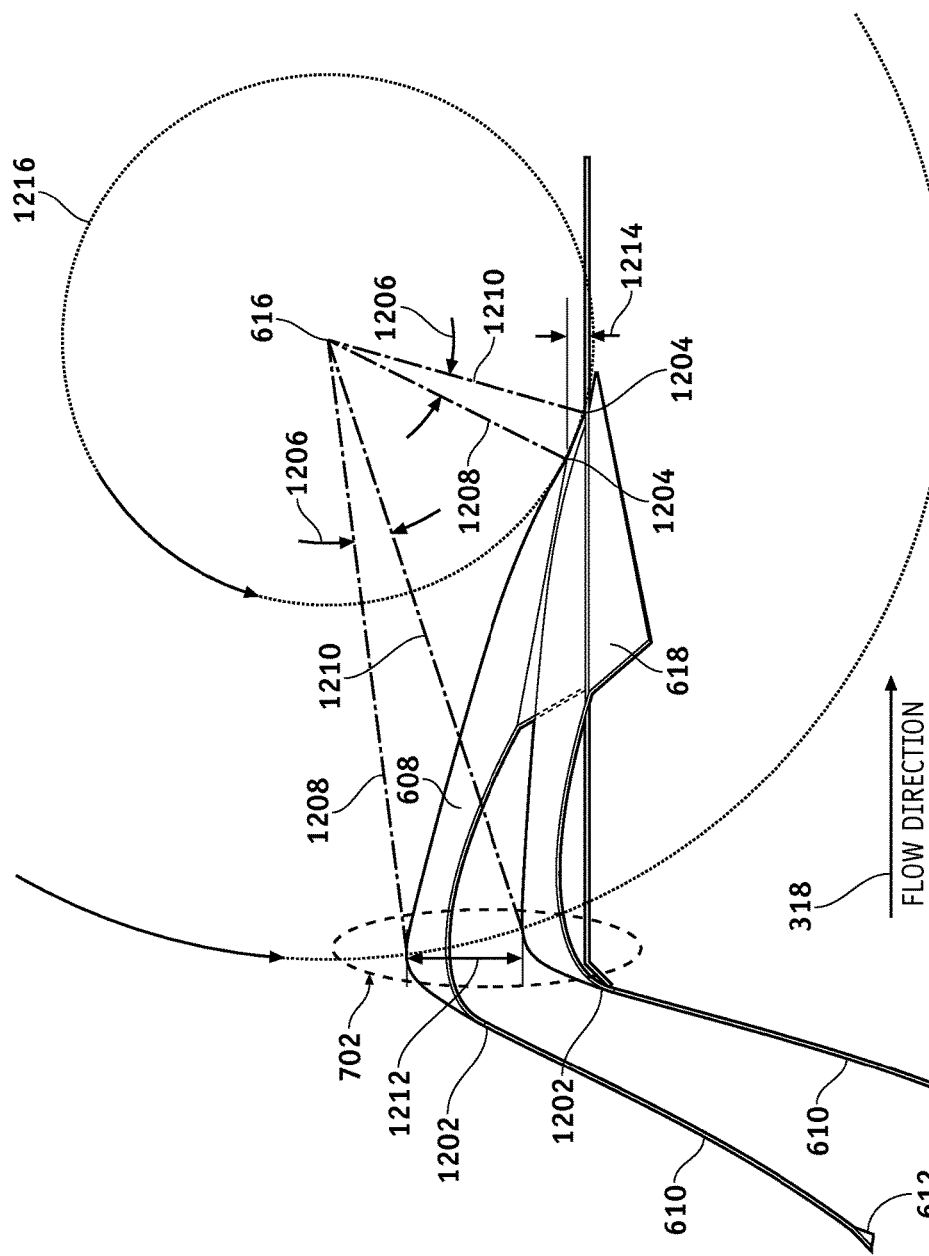
FIG. 12 is an illustration of motion of an exemplary nozzle throat control system rotating around an off-body axis-of-rotation without opening any gap according to an embodiment of the disclosure.

FIG. 12 is an illustration of motion of the exemplary nozzle throat control system 600 (mechanism 600) rotating around an off-body axis-of-rotation 616 without opening any gap such as the asymmetric gaps 420 and 518 shown in FIGS. 4 and 5 respectively according to an embodiment of the disclosure. The mechanism 600 rotates around the off-body axis-of-rotation 616 perpendicular to the flow direction 318. A distance between the off-body axis-of-rotation 616 and a forward point 1202 is greater than the distance between the off-body axis-of-rotation 616 and an aft point 1204. Therefore a same amount of rotation 1206 produces a greater travel 1212 at the forward point 1202 than a travel 1214 at the aft point 1204. An effect is the throat area 702 change at the forward point 1202. In one embodiment, for example but without limitation, the amount of rotation 1206 may be about 9 degrees to about 10 degrees, the forward point 1202 may be about 5 inches to about 6 inches, and the travel 1214 at the aft point 1204 may be about 0.7 inches to about 1 inches. A contour of the contoured interface surface 618 may be defined by a plurality of circles 1402 (FIG. 14) centered along the off-body axis-of-rotation 616, for example, similar to a circle 1216 in FIG. 12.

Figure 13:
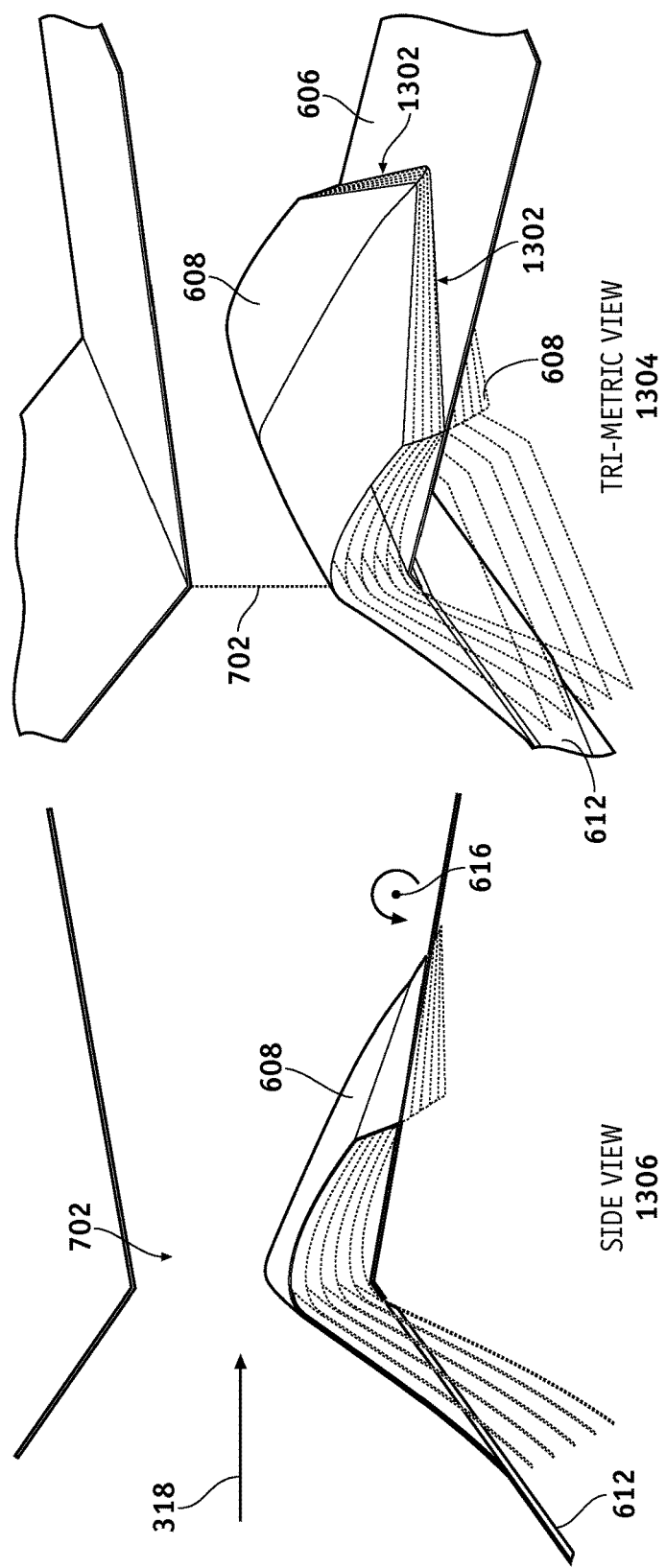
FIG. 13 is an illustration of a side view, and a tri-metric view of an exemplary nozzle throat area utilizing a nozzle throat control system with angular trailing edges showing various positions of the nozzle throat control system during rotation around an off-body axis-of-rotation without opening any gap according to an embodiment of the disclosure.

FIG. 13 is an illustration of a side view 1306, and a tri-metric view 1304 of an exemplary nozzle throat area utilizing the nozzle throat control system 600 showing various positions of the nozzle throat control system 600 during rotation around the off-body axis-of-rotation 616 without opening any gap according to an embodiment of the disclosure. In one embodiment, the gap in the convergent section 704 (FIG. 7) can be sealed with a simple translating surface such as the slide interface 612. The mechanism 600 passes through a constant gap 1302 in the angle notched nozzle surface 606 that is angled relative to the flow direction 318. The constant gap 1302 does not change in width during movement.

Figure 14:
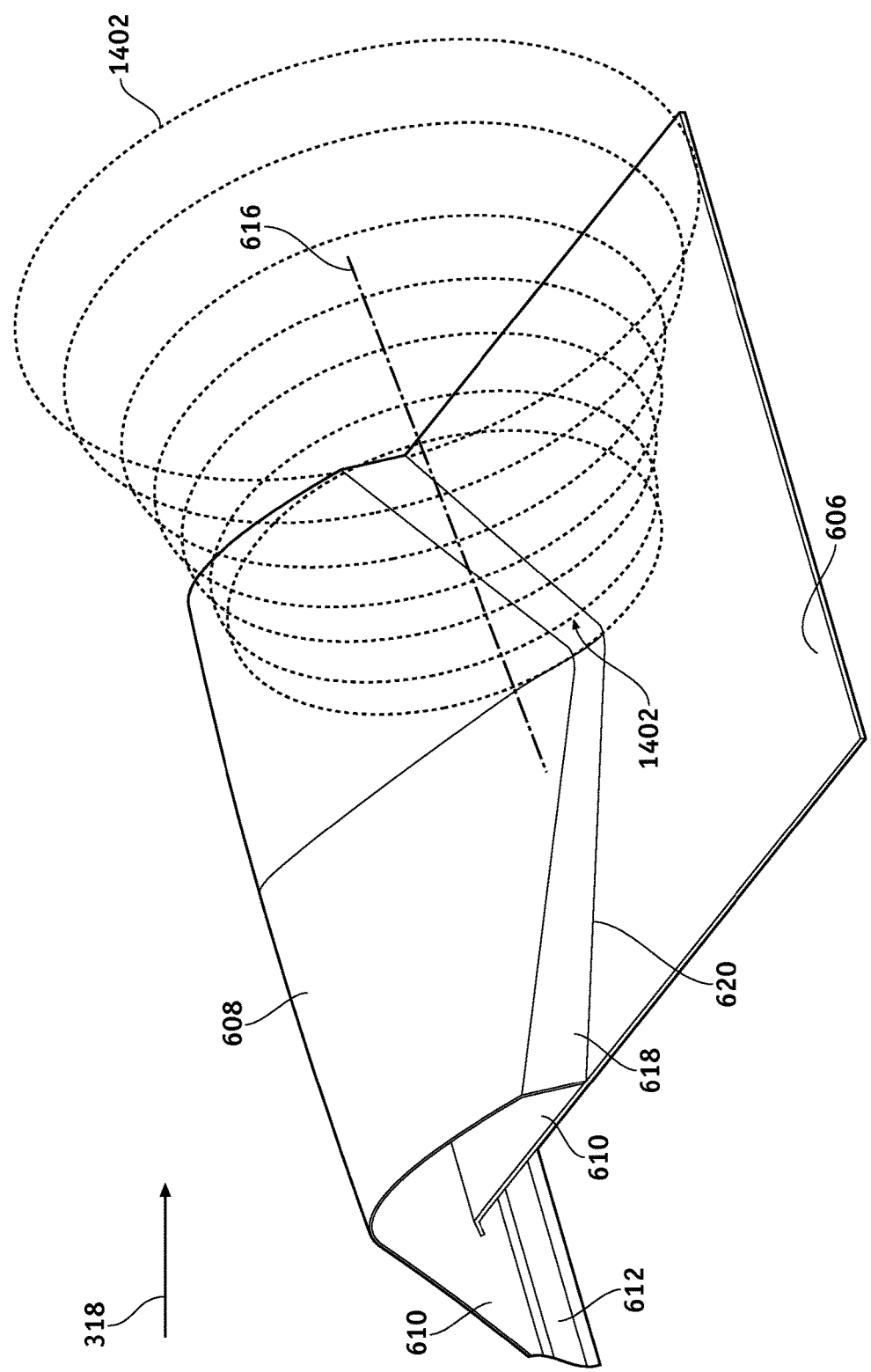
FIG. 14 is an illustration of an exemplary nozzle throat control system interface surface thereof according to an embodiment of the disclosure.

FIG. 14 is an illustration of the exemplary nozzle throat control system 600 showing the contoured interface surface 618 thereof according to an embodiment of the disclosure. The contoured interface surface 618 may be defined by the plurality of circles 1402 (e.g., a substantially infinite number of circles) centered along the off-body axis-of-rotation 616. The circle 1216 in FIG. 12 is an example of one of the circles 1402. Height of the contoured interface surface 618 is whatever is traced out by a rotation angle (e.g., about 9.5 degrees). Increasing or decreasing a radius of the circles 1402 allows the angular trailing edges 620 of the contoured interface surface 618 to be of any arbitrary shape. For example, the angular trailing edges 620 may be angled relative to the flow direction 318.

Figure 15:
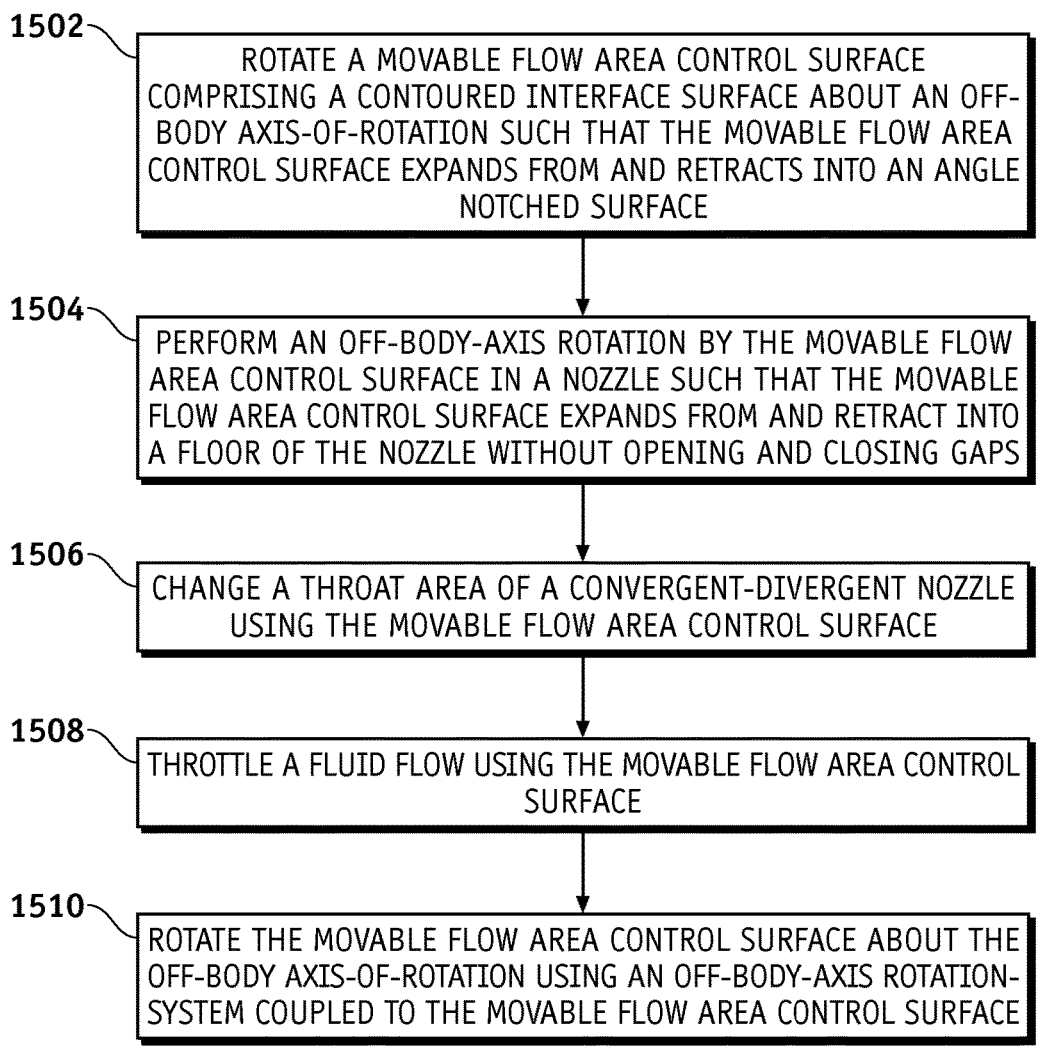
FIG. 15 is an illustration of an exemplary flowchart showing a process for controlling a nozzle throat area according to an embodiment of the disclosure.

FIG. 15 is an illustration of an exemplary flowchart showing a process 1500 for controlling a nozzle throat area according to an embodiment of the disclosure. The various tasks performed in connection with process 1500 may be performed mechanically, by software, hardware, firmware, computer-readable software, computer readable storage medium, or any combination thereof. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

For illustrative purposes, the following description of process 1500 may refer to elements mentioned above in connection with FIGS. 1-14. In practical embodiments, portions of the process 1500 may be performed by different elements of the system 600 and system 800 such as: the variable throat area mechanism 802, the actuator 804, the controller 808, the angle notched nozzle surface 606, the movable surface 608, the forward angle side 610, the slide interface 612, the forward flow panel 614, the off-body axis-of-rotation 616, the contoured interface surface 618, the angular trailing edges 620, the off-body-axis rotation-system 622 etc. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

Process 1500 may begin by rotating a movable flow area control surface such as the movable flow area control surface 608 comprising a contoured interface surface such as the contoured interface surface 618 about an off-body axis-of-rotation such as the off-body axis-of-rotation 616 such that the movable flow area control surface 608 expands from and retracts into an angle notched surface such as the angle notched surface 606 (task 1502).

Process 1500 may continue by performing an off-body-axis rotation by the movable flow area control surface 608 in a nozzle such as the convergent-divergent nozzle 700 such that the movable flow area control surface 608 expands from and retracts into a floor (e.g., the angle notched surface 606) of the nozzle without opening and closing a gap (task 1504). In this manner, gaps such as the asymmetric gaps 518 can be avoided. The floor of the nozzle may comprise, for example but without limitation, the angle notched surface 606, a side wall of a nozzle, or other surface of a nozzle.

Process 1500 may continue by changing a throat area such as the throat are 702 of the convergent-divergent nozzle 700 using the movable flow area control surface 608 (task 1506).

Process 1500 may continue by throttling a fluid flow using the movable flow area control surface 608 (task 1508).

Process 1500 may continue by rotating the movable flow area control surface 608 about the off-body axis-of-rotation 616 using an off-body-axis rotation-system such as the off-body-axis rotation-system 622 coupled to the movable flow area control surface 608 (task 1510).

Figure 16:
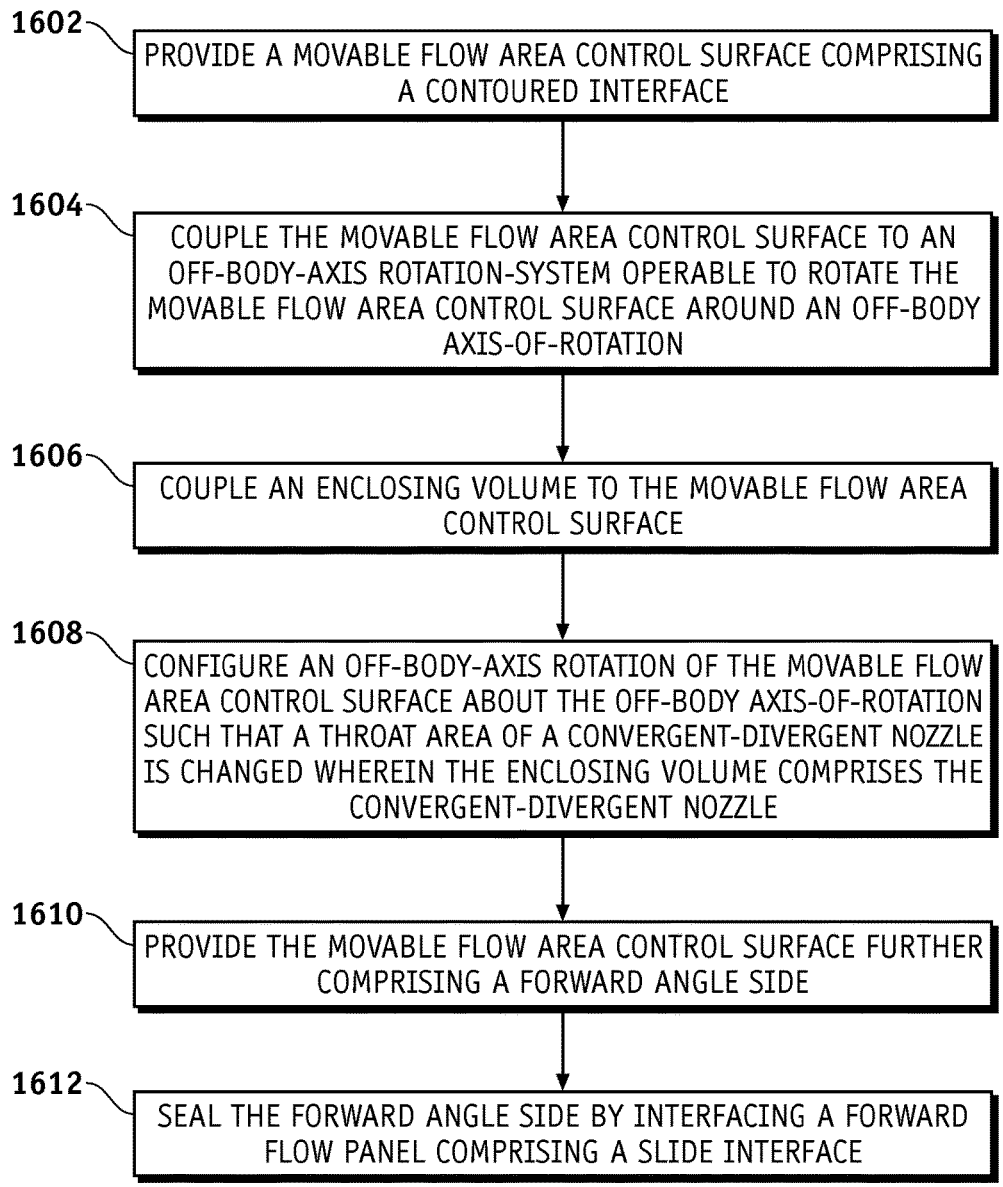
FIG. 16 is an illustration of an exemplary flowchart showing a process for providing a variable area mechanism according to an embodiment of the disclosure.

FIG. 16 is an illustration of an exemplary flowchart showing a process 1600 for providing a variable area mechanism according to an embodiment of the disclosure. The various tasks performed in connection with process 1600 may be performed mechanically, by software, hardware, firmware, computer-readable software, computer readable storage medium, or any combination thereof. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

For illustrative purposes, the following description of process 1600 may refer to elements mentioned above in connection with FIGS. 1-14. In practical embodiments, portions of the process 1600 may be performed by different elements of the system 600 and system 800 such as: the variable throat area mechanism 802, the actuator 804, the controller 808, the angle notched nozzle surface 606, the movable surface 608, the forward angle side 610, the slide interface 612, the forward flow panel 614, the off-body axis-of-rotation 616, the contoured interface surface 618, a the angular trailing edges 620, the off-body-axis rotation-system 622 etc. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

Process 1600 may begin by providing a movable flow area control surface such as the movable flow area control surface 608 comprising a contoured interface surface such as the contoured interface surface 618 (task 1602).

Process 1600 may continue by coupling the movable flow area control surface 608 to an off-body-axis rotation-system such as the an off-body-axis rotation-system 622 operable to rotate the movable flow area control surface 608 around an off-body axis-of-rotation such as the off-body axis-of-rotation 616 (task 1604).

Process 1600 may continue by coupling an enclosing volume to the movable flow area control surface 608 (task 1606). As mentioned above, for example but without limitation, the enclosing volume may comprise, the nozzle 700, a pipe, a pump, a hydraulic pump-jet, or other enclosing volume.

Process 1600 may continue by configuring an off-body-axis rotation of the movable flow area control surface 608 about the off-body axis-of-rotation 616 such that a throat area such as the throat area 702 of a convergent-divergent nozzle such as the convergent-divergent nozzle 700 is changed wherein the enclosing volume comprises the convergent-divergent nozzle 700 (task 1608).

Process 1600 may continue by providing the movable flow area control surface 608 further comprising a forward angle side such as the forward angle side 310 (task 1610).

Process 1600 may continue by sealing the forward angle side 310 by interfacing a forward flow panel such as the forward flow panel 614 comprising a slide interface such as the slide interface 612 (task 1612).

Figure 17:
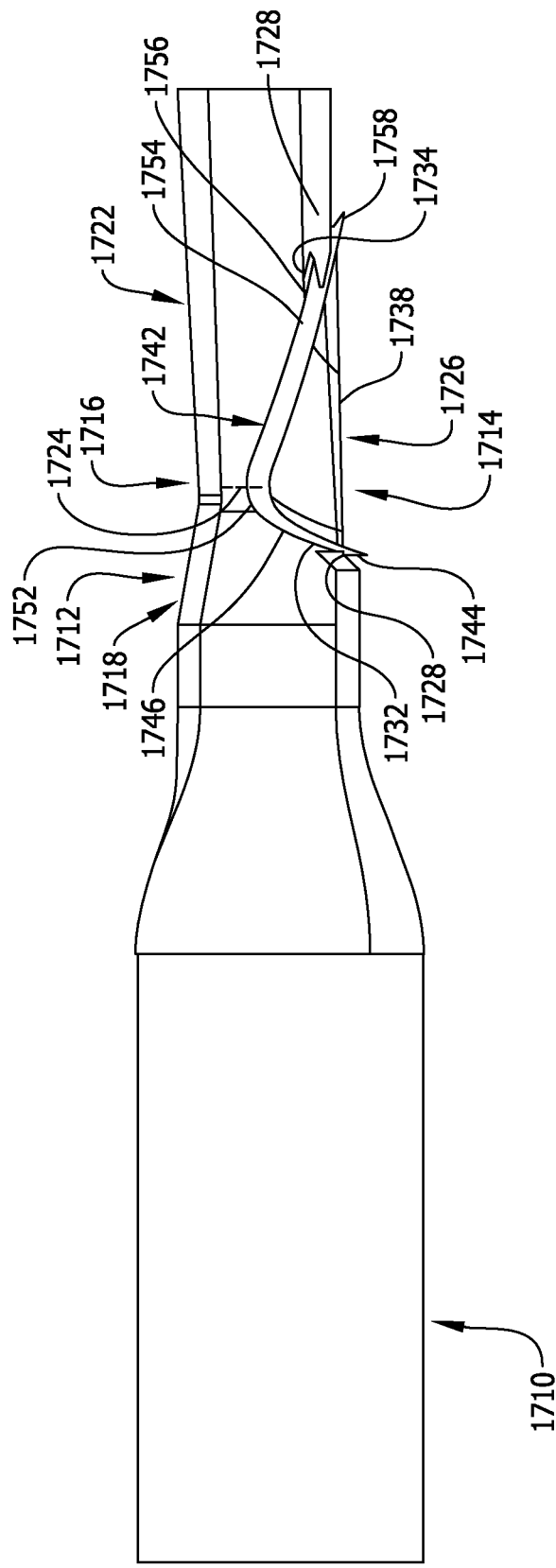
FIG. 17 is a representation of a cross-sectional view of a nozzle employing a variation of the self-sealing apparatus that adjusts a throat area of the nozzle.

FIG. 17 is a representation of an aircraft engine 1710 having a two-dimensional convergent/divergent nozzle 1712 that employs a variation of the apparatus 1714 of this disclosure. FIG. 17 is a representation of a cross-sectional view of the nozzle 1712. It should be understood that the portion of the nozzle 1712 not shown in FIG. 17 and not shown in other drawing figures to be described is a mirror image of the nozzle construction represented in the drawing figures. The apparatus 1714 adjusts a throat cross-sectional area 1716 of the nozzle 1712 and is configured to be self-sealing, thereby requiring fewer parts and providing a more simplified construction of the throat cross-sectional area 1716 of the nozzle 1712.

As stated earlier, the nozzle 1712 is a two-dimensional convergent/divergent nozzle having a convergent section 1718 and a divergent section 1722. The nozzle 1712 has interior surfaces that define a general rectangular cross-sectional of the nozzle. The flow direction through the nozzle is from the convergent section 1718 at a forward end of the nozzle 1712 toward the divergent section 1722 at an aft end of the nozzle. A throat cross-sectional area in a nozzle throat plane 1724 is positioned between the convergent section 1718 of the nozzle and the divergent section 1722 of the nozzle.

Figure 19:
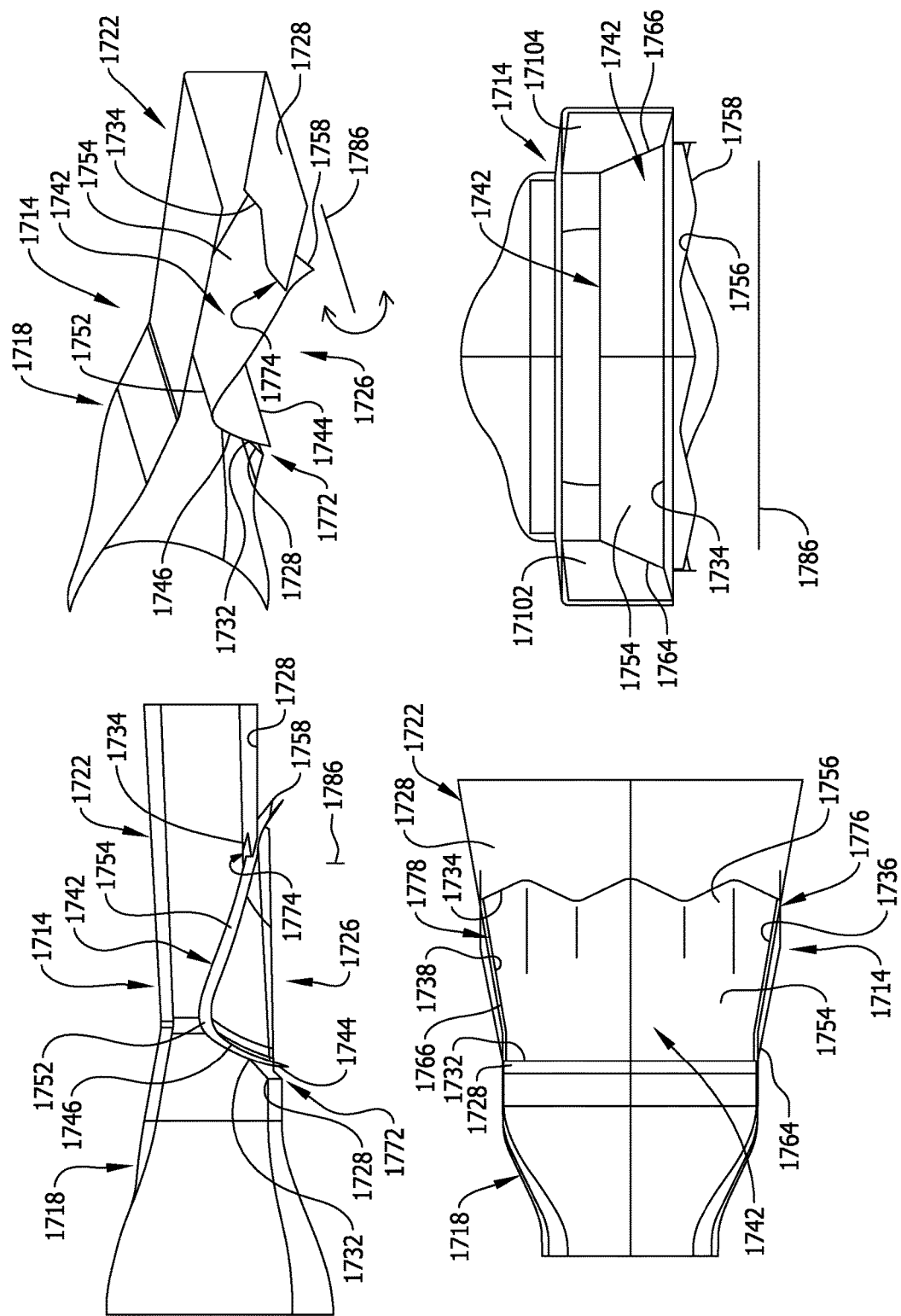
FIG. 19 is a representation of a side view, tri-metric view, top view and aft looking forward view of the nozzle adjusted to a minimum throat cross-sectional area.

An opening 1726 extends through an interior surface 1728 of the nozzle. The opening 1726 is intersected by the throat cross-sectional area in the throat plane 1724. The opening 1726 is defined by a straight forward edge 1732 of the interior surface 1728 of the nozzle 1712 at a forward end of the opening. The forward edge 1732 is positioned perpendicular to the flow direction through the nozzle 1712. The opening 1726 is also defined by an aft edge 1734 of the interior surface 1728 of the nozzle 1712 at an aft end of the opening 1726 opposite the forward end of the opening. Referring to FIG. 19, it can be seen that the aft edge 1734 is comprised of a plurality of triangular sections of the aft edge 1734 that extend across the interior surface 1728 of the nozzle 1712. The opening 1726 is further defined by a first side edge 1736 of the interior surface 1728 of the nozzle. The first side edge 1736 extends straight along one side of the interior surface 1728 of the nozzle 1712 between the forward edge 1732 and the aft edge 1734. The opening 1726 is still further defined by a second side edge 1738 of the interior surface 1728 of the nozzle 1712. The second side edge 1738 extends straight along the opposite side of the opening 1726 from the first side edge 1736 between the forward edge 1732 and the aft edge 1734.

A flow control panel 1742 is positioned in the opening 1736. The flow control panel 1742 is a single moving piece with three distinct surfaces. The flow control panel has a forward edge 1744 that extends straight across the opening 1726 adjacent the forward edge 1732 of the interior surface 1728 of the nozzle 1712. The forward edge 1744 is positioned outside the nozzle 1712 and perpendicular to the flow direction through the nozzle 1712. The flow control panel 1742 has a forward surface 1746 that extends from the forward edge 1744 through the opening 1726 and into the convergent section 1718 of the nozzle 1712. The forward surface 1746 extends through the opening 1726 in close proximity to the forward edge 1732 of the interior surface 1728 of the nozzle 1712 and to a throat surface 1752 of the flow control panel 1742. As represented in FIG. 17, the throat surface 1752 has a curved cross-section configuration that is intersected by the throat cross-sectional area in the throat plane 1724 of the nozzle 12. From the throat surface 1752 the flow control panel 1742 extends through the divergent section 1722 of the nozzle to an aft surface 1754 of the flow control panel 1742. As the aft surface 1754 extends from the throat surface 1752, the aft surface 1754 is formed with a plurality of ridges 1756 having general, triangular cross-sectionals. The ridges 1756 are positioned in close proximity to the triangular sections of the aft edge 1734 of the opening 1726. The ridges 1756 extend to an aft edge 1758 of the flow control panel. The ridges 1756 form the aft edge 1758 of the flow control panel 1742 with a plurality of triangular sections as represented in FIG. 19. The flow control panel 1742 also has a first side edge 1764 and an opposite second side edge 1766. The first side edge 1764 and the second side edge 1766 of the flow control panel 1742 extend straight between the forward edge 1744 and aft edge 1758 of the flow control panel. The first side edge 1764 and the second side edge 1766 also extend parallel with and in close proximity to the first side edge 1736 of the opening 1726 and the second side edge 1738 of the opening 1726.

There is a minimally dimensioned forward gap 1772 between the forward surface 1746 of the flow control panel 1742 and the forward edge 1732 of the opening 1726. There is also a minimally dimensioned aft gap 1774 between the aft surface 1754 of the flow control panel 1742 and the aft edge 1734 of the opening 1726. There is also a minimally dimensioned first side gap 1776 between the first side edge 1764 of the flow control panel and the first side edge 1736 of the opening 1726 and a minimally dimensioned second side gap 1778 between the second side edge 1766 of the flow control panel and the second side edge 1738 of the opening 1726. These minimally dimensioned gaps function to prevent passage of hot gasses through the gaps and outside of the nozzle 1712 while also enabling movement of the flow control panel 1742 in the opening 1726 as will be described. There are no structures of the nozzle 1712 such flaps, doors, and other complicated sealing mechanisms that extend across the gaps. The gaps function to allow for significantly simplified sealing approaches, as the gaps are minimally dimensioned and constant through rotation of the flow control panel 1742.

Figure 18:
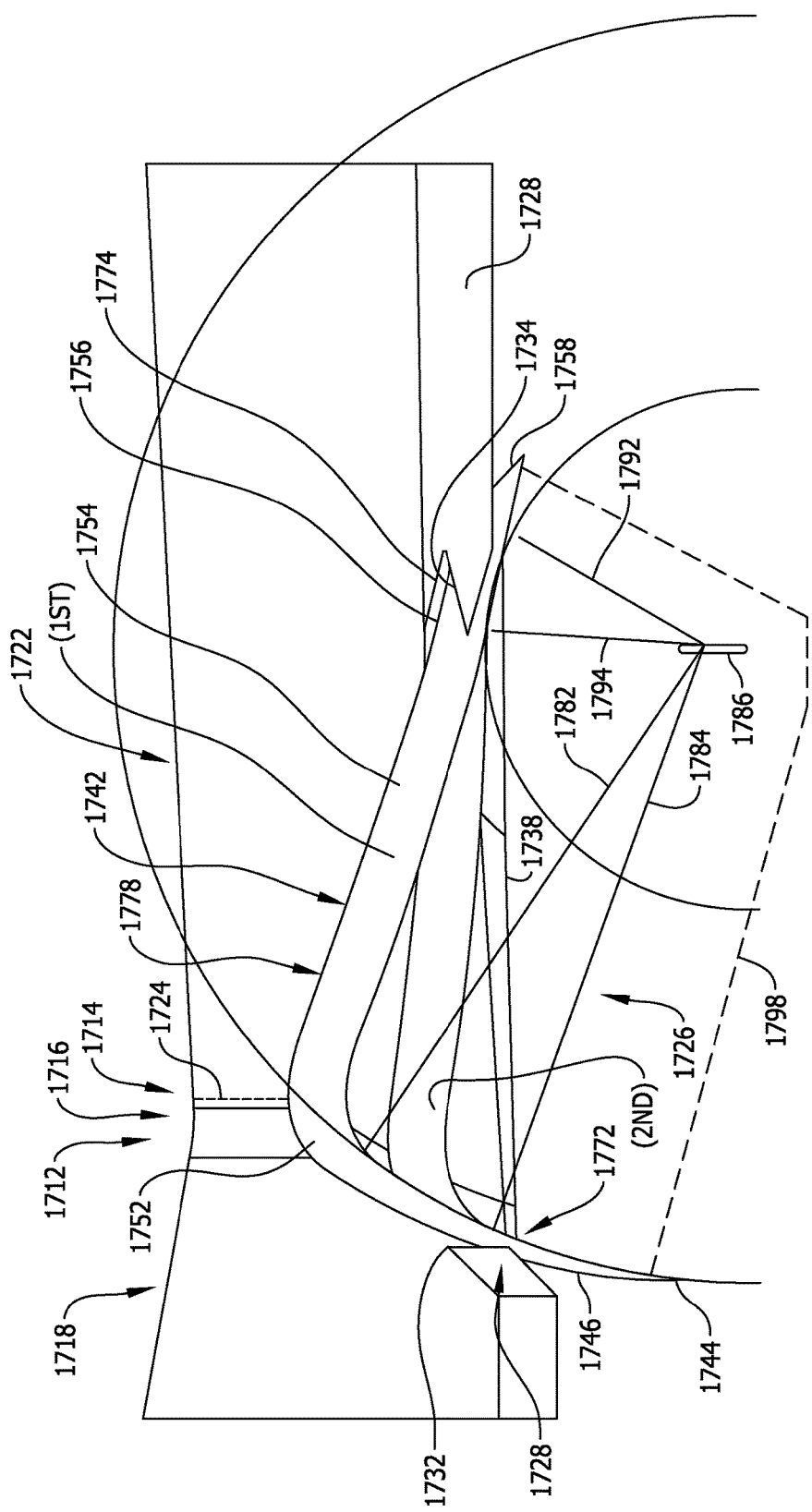
FIG. 18 is a representation of a cross-sectional view of the nozzle and the range of adjustment of the throat cross-sectional area between a minimum throat cross-sectional area and a maximum throat cross-sectional area.

Referring to FIG. 18, a portion of the flow control panel forward surface 1746 between the radius lines 1782, 1784 has a cross-sectional configuration of an arc. The arc cross-sectional configuration has a constant radius of curvature between the radius lines 1782, 1784 from a rotation axis 1786. As represented in FIG. 18, the rotation axis 1786 is positioned outside the nozzle 1712 and on an opposite side of the flow control panel 1742 from the forward surface 1746, throat surface 1752 and aft surface 1754 of the flow control panel. Additionally, a portion of the aft surface 1754 of the flow control panel 1742 between the radius lines 1792, 1794 has a cross-sectional configuration of an arc. The arc has a constant radius of curvature between the radius lines 1792, 1794. In the example represented in FIG. 18, the length dimension of the radius lines 1782, 1784 is 2.5 times the length dimension of the radius lines 1792, 1794. However, the length relation of the radius lines could be different in other applications. This configuration of the flow control panel 1742 enables the forward surface 1746 of the flow control panel 1742 to be rotated about the rotation axis 1786 between the radius lines 1782, 1784 with the forward gap 1772 between the forward surface 1746 and the forward edge 1732 of the opening 1726 remaining constant. This enables the forward gap 1772 to have a minimal dimension to simplify sealing, and to eliminate the need for any sealing panels or flaps across the forward gap 1772. Additionally, this configuration of the flow control panel 1748 enables the dimension of the aft gap 1774 between the aft surface 1754 of the flow control panel 1742 and the aft edge 1734 of the opening 1726 to remain constant as the aft surface 1754 is rotated between the radius lines 1792, 1794. This enables the aft gap 1774 to have a minimal dimension to simplify sealing, and to eliminate the need for any sealing panels or flaps across the aft gap 1774.

Also represented in FIG. 18 by dashed lines 1798 is an actuator device that is operatively connected to the flow control panel 1742 and the rotation axis 1786. The actuator device is operable to rotate the flow control panel 1742 about the rotation axis 1786 between a first position ($1^{st}$) of the flow control panel 1742 in the interior of the nozzle 1712 represented in FIGS. 18 and 19, through an intermediate position of the flow control panel 1742 represented in FIG. 20, to a second position ($2^{nd}$) of the flow control panel 1742 in the interior of the nozzle 1712 represented in FIG. 18 and FIG. 21. Any type of actuator could be used for this purpose. When the actuator device 1798 is operated to rotate the flow control panel 1742 from the first position ($1^{st}$) of the flow control panel in the interior of the nozzle 1712 to the second position ($2^{nd}$) of the flow control panel in the interior of the nozzle, the throat surface 1752 of the flow control panel increases the throat cross-sectional area in the throat plane 1724. When the actuator device 1798 is operated to rotate the flow control panel 1742 from the second position ($2^{nd}$) of the flow control panel in the interior of the nozzle 1712 to the first position ($1^{st}$) of the flow control panel in the interior of the nozzle, the throat surface 1752 of the flow control panel decreases the throat cross-sectional area in the throat plane 1724.

Figure 22:
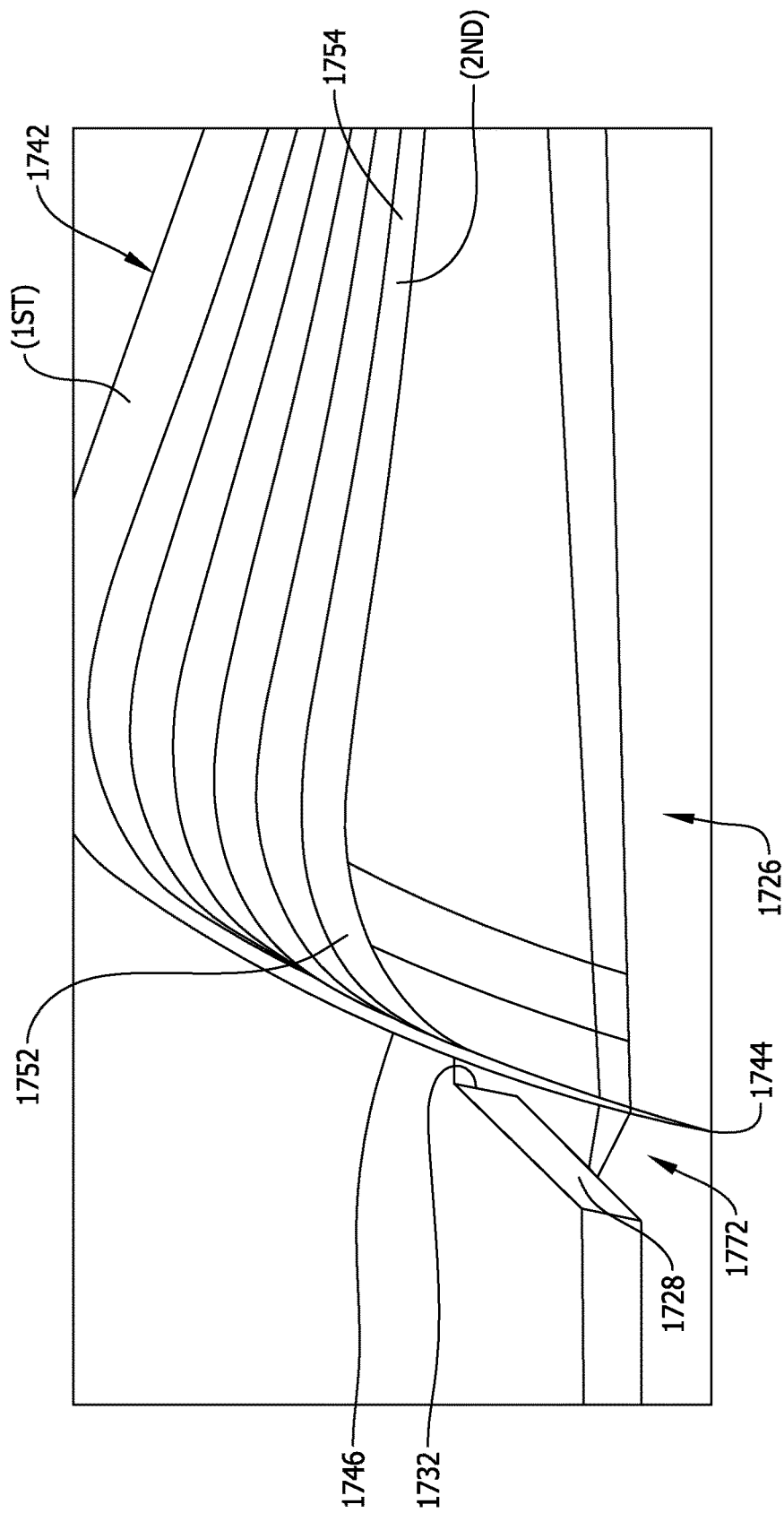
FIG. 22 is a representation of a partial cross-sectional view of the nozzle with a forward surface and throat surface of a flow control panel represented in their relative positions between the minimum throat cross-sectional area and the maximum throat cross-sectional area.
Figure 23:
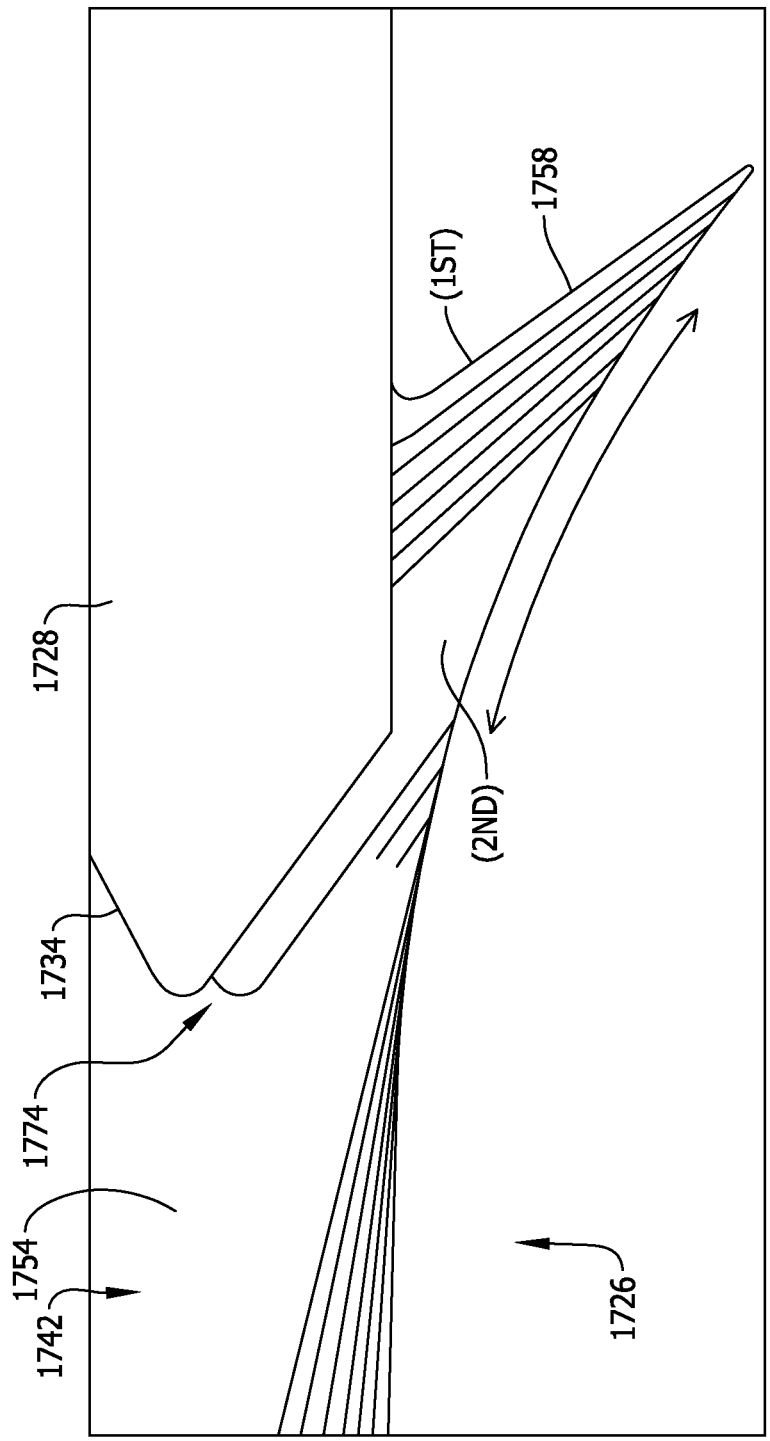
FIG. 23 is a representation of a partial cross-sectional view of the nozzle with an aft surface of the flow control panel represented at its relative positions between the minimum throat cross-sectional area and the maximum throat cross-sectional area.
Figure 24:
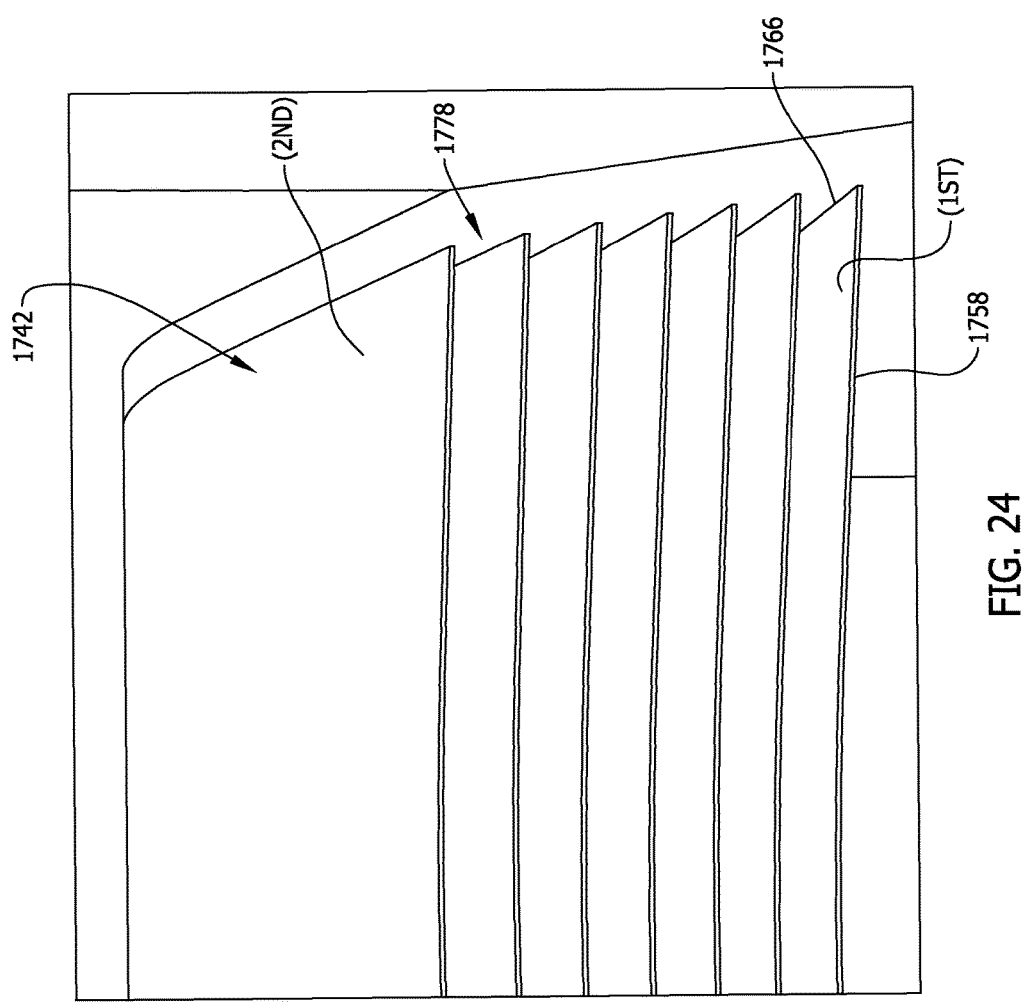
FIG. 24 is a representation of a partial cross-sectional view of the nozzle with an aft surface of the flow control panel represented at its relative positions between the minimum throat cross-sectional area and the maximum throat cross-sectional area.

As represented in FIGS. 22, 23 and 24, the forward edge 1744 of the flow control panel 1742 moves away from the forward edge 1732 of the opening 1726, the control panel forward surface 1746 moves along the forward edge 1732 of the opening 1726 and the aft edge 1758 of the flow control panel 1742 moves toward the aft edge 1734 of the opening 1726 in response to the flow control panel 1742 being rotated about the rotation axis 1786 from the first position ($1^{st}$) of the flow control panel in the interior of the nozzle 1712 to the second position ($2^{nd}$) of the flow control panel in the interior of the nozzle. The series of lines between the first position ($1^{st}$) of the flow control panel 1742 in the interior of the nozzle 1712 and the second position ($2^{nd}$) of the flow control panel 1742 in the interior of the nozzle 1712 represent various intermediate positions of the flow control panel 1742 as it is moved between the first position ($1^{st}$) and the second position ($2^{nd}$). Furthermore, the forward edge 1744 of the flow control panel 1742 moves toward the forward edge 1732 of the opening 1726, the control panel forward surface 1746 moves along the forward edge 1732 of the opening 1726 and the aft edge 1758 of the flow control panel moves away from the aft edge 1734 of the opening 1726 in response to the flow control panel 1742 being moved from the second position ($2^{nd}$) of the flow control panel 1742 in the interior of the nozzle 1712 to the first position ($1^{st}$) of the flow control panel 1742 in the interior of the nozzle 1712. The arc cross-sectional configurations of the forward surface 1746 and aft surface 1754 of the flow control panel 1742 and the position of the rotation axis 1786 relative to the nozzle 1712 simplify the construction of the nozzle. The cross-section configurations of the forward surface 1746 and aft surface 1754 of the flow control panel 1742 also enable the dimension of the forward gap 1772 between the forward surface 1746 of the flow control panel 1742 and the forward edge 1732 of the opening 1726 and the dimension of the aft gap 1774 between the aft surface 1754 of the flow control panel 1742 and the aft edge 1734 of the opening 1726 to remain constant as the flow control panel 1742 is moved between the first position ($1^{st}$) of the flow control panel 1742 in the interior of the nozzle 1712 and the second position ($2^{nd}$) of the flow control panel 1742 in the interior of the nozzle. The constant dimensions of the forward gap 1772 and aft gap 1774 as the flow control panel 1742 is moved in the opening 1726 enable the gaps to be minimally dimensioned to simplify sealing between the flow control panel 1742 and the interior surface 1728 of the nozzle 1712. This enables the elimination of any need for secondary sealing system of ramps, covers or doors.

Figure 20:
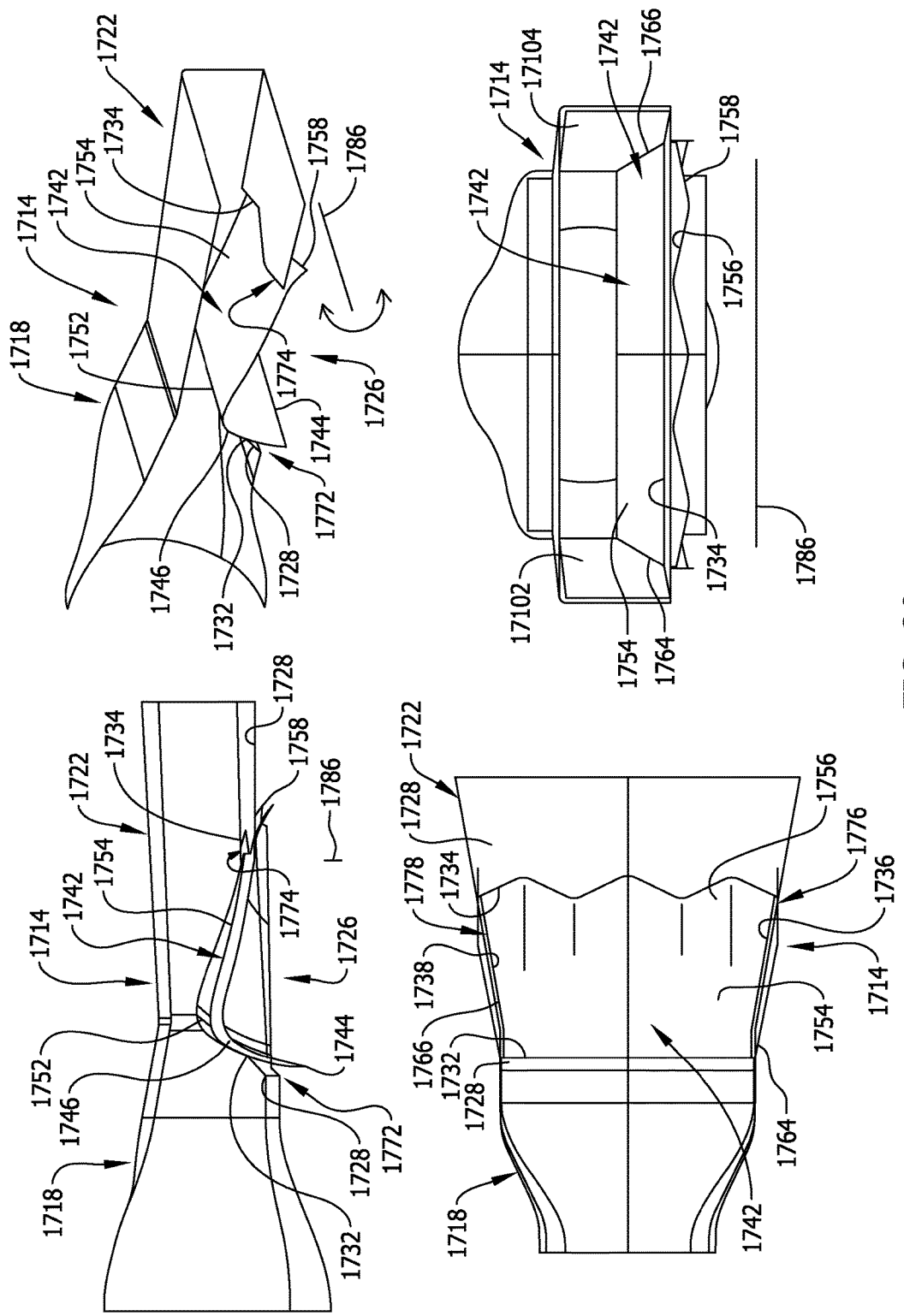
FIG. 20 is a representation of a side view, tri-metric view, top view and aft looking forward view at an intermediate adjusted throat cross-sectional area.
Figure 21:
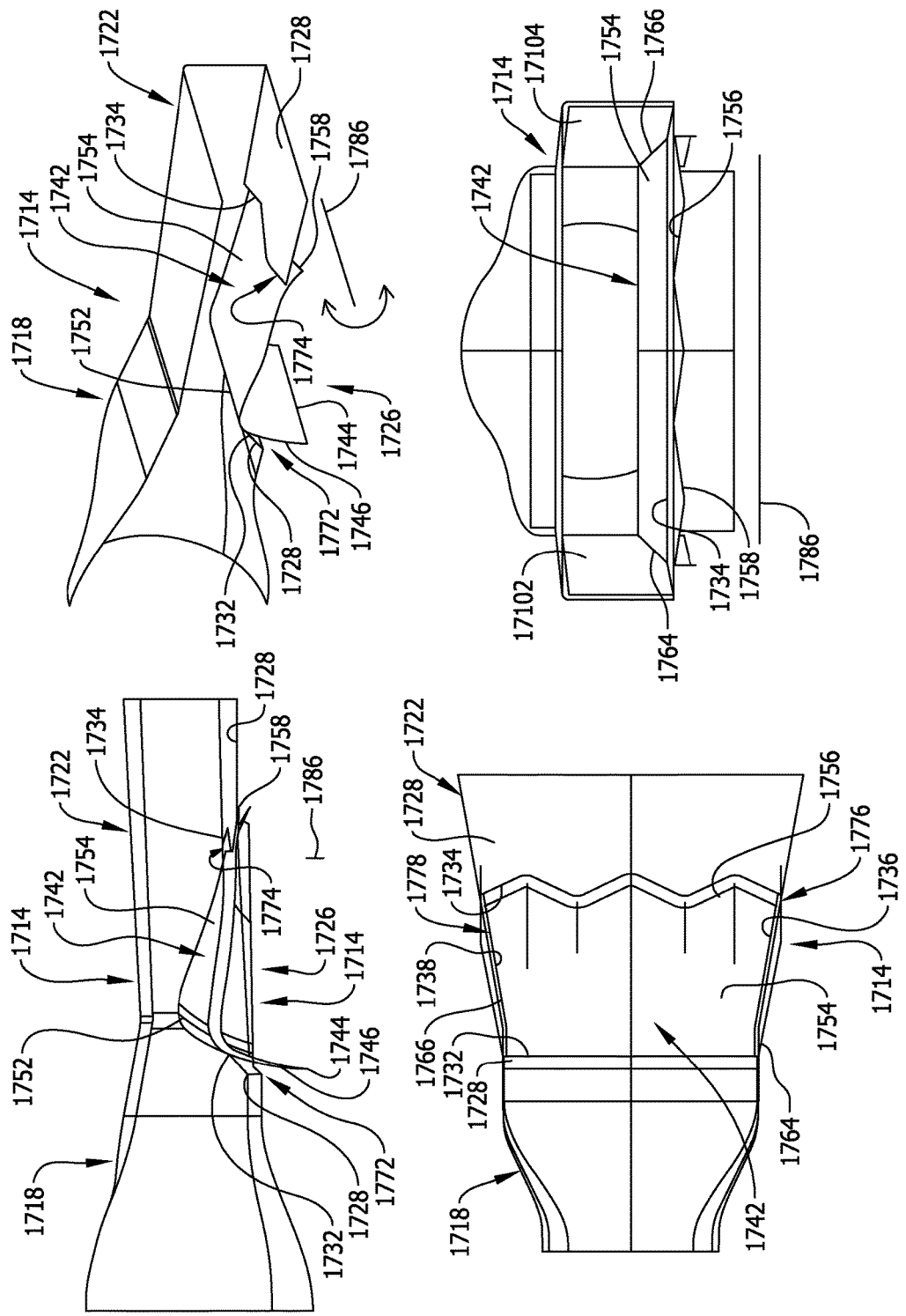
FIG. 21 is a representation of a top view, a tri-metric view, a side view and an aft looking forward view of the nozzle adjusted to a maximum throat cross-sectional area.

Additionally, as represented in FIG. 24, the side gaps 1776, 1778 between the first side edge 1736 of the opening 1726 and the first side edge 1764 of the flow control panel 1742 and between the second side edge 1738 of the opening 1726 and the second side edge 1766 of the flow control panel 1742 remain constant as the flow control panel 1742 is moved between the first position ($1^{st}$) and the second position ($2^{nd}$) in the interior of the nozzle 1712. This enables the side gaps 1776, 1778 to have minimalized dimensions to simplify sealing. This, in turn, enables the elimination of any sealing system of ramps, covers or doors in the side gaps 1776, 1778. Furthermore, the configuration of the flow control panel 1742 also enables opposite side walls 1802, 1804 of the divergent section 1722 of the nozzle 1712 to diverge as represented in FIGS. 19-21 while maintaining the constant dimension of the side gaps 1776, 1778.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 810 to cause the processor module 810 to perform specified operations. Such instructions, generally referred to as "computer program code" or "program code" (which may be grouped in the form of computer programs or other groupings), when executed, enable variable area mechanism with angular trailing edges methods of the system 800.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-14 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An apparatus that adjusts a throat area of a nozzle, the apparatus comprising:

a nozzle having an interior surface, the interior surface extending around an interior of the nozzle, the nozzle having a forward end and an aft end, the nozzle having a flow direction through the interior of the nozzle from the forward end of the nozzle to the aft end of the nozzle, the nozzle having a throat cross-sectional area in the interior of the nozzle, the throat cross-sectional area being intermediate the forward end of the nozzle and the aft end of the nozzle;

an opening through the interior surface of the nozzle, the interior surface of the nozzle having a forward edge at a forward end of the opening and the interior surface of the nozzle having an aft edge at an aft end of the opening that is opposite the forward end of the opening, the interior surface having a first side edge at a first side of the opening and the interior surface having a second side edge at a second side of the opening, the first side of the opening being opposite the second side of the opening;

a flow control panel extending through the opening and into the interior of the nozzle, the flow control panel having a forward surface that opposes the forward edge of the interior surface with there being a forward gap between the forward surface and the forward edge;

an actuator device operatively connected to the flow control panel, the actuator device being operable to move the flow control panel between a first position of the flow control panel in the interior of the nozzle and a second position of the flow control panel in the interior of the nozzle where when the flow control panel is moved from the first position of the flow control panel in the interior of the nozzle to the second position of the flow control panel in the interior of the nozzle the flow control panel decreases the throat cross-sectional area and when the flow control panel is moved from the second position of the flow control panel in the interior of the nozzle to the first position of the flow control panel in the interior of the nozzle the flow control panel increases the throat cross-sectional area;

as the flow control panel is moved between the first position of the flow control panel in the interior of the nozzle and the second position of the flow control panel in the interior of the nozzle a dimension of the forward gap between the forward surface of the flow control panel and the forward edge of the interior surface of the nozzle remains constant;

the actuator device moves the flow control panel about a rotation axis as the actuator device moves the flow control panel between the first position of the flow control panel in the interior of the nozzle and the second position of the flow control panel in the interior of the nozzle; and, the forward surface of the flow control panel has a cross-sectional configuration that defines an arc having a constant radius of curvature from the rotation axis.

2. The apparatus of claim 1, further comprising:
the dimension of the forward gap provides for simplified sealing against passage of hot gasses through the forward gap.

3. The apparatus of claim 1, further comprising:
no part of the nozzle extends across the forward gap.

4. The apparatus of claim 1, further comprising:
the flow control panel having an aft surface that opposes the aft edge of the interior surface of the nozzle with there being an aft gap between the aft surface and the aft edge; and,
as the flow control panel is moved between the first position of the flow control panel in the interior of the nozzle and the second position of the flow control panel in the interior of the nozzle a dimension of the aft gap between the aft surface of the flow control panel and the aft edge of the interior surface remains constant.

5. The apparatus of claim 4, further comprising:
the flow control panel is a single piece having a throat surface that is positioned between the forward surface and the aft surface, the flow control panel having a first side edge that extends along the forward surface, the throat surface and the aft surface of the flow control panel, the first side edge of the flow control panel opposes the first side edge of the interior surface of the nozzle with there being a first side gap between the first side edge of the flow control panel and the first side edge of the interior surface of the nozzle, the flow control panel having a second side edge that extends along the forward surface, the throat surface and the aft surface of the flow control panel, the second side edge of the flow control panel opposes the second side edge of the interior surface of the nozzle with their being a second side gap between the second side edge of the flow control panel and the second side edge of the interior surface of the nozzle; and,
as the flow control panel is moved between the first position of the flow control panel in the interior of the nozzle and the second position of the flow control panel in the interior of the nozzle a dimension of the first side gap between the first side edge of the flow control panel and the first side edge of the interior surface of the nozzle remains constant and a dimension of the second side gap between the second side edge of the flow control panel and the second side edge of the interior surface of the nozzle remains constant.

6. The apparatus of claim 4, further comprising:
the flow control panel having a forward edge along the forward surface and the flow control panel having an aft edge along the aft surface;
the forward edge of the flow control panel moves toward the forward edge of the interior surface of the nozzle, the forward surface of the flow control panel moves along the forward edge of the interior surface of the nozzle, the aft edge of the flow control panel moves away from the aft edge of the interior surface of the nozzle and the aft surface of the flow control panel moves along the aft edge of the interior surface of the nozzle in response to the flow control panel being moved from the first position of the flow control panel in the interior of the nozzle to the second position of the flow control panel in the interior surface of the nozzle; and,
the forward edge of the flow control panel moves away from the forward edge of the interior surface of the nozzle, the forward surface of the flow control panel moves along the forward edge of the interior surface of the nozzle, the aft edge of the flow control panel moves toward the aft edge of the interior surface of the nozzle and the aft surface of the flow control panel moves along the aft edge of the interior surface of the nozzle in response to the flow control panel being moved from the second position of the flow control panel in the interior surface of the nozzle to the first position of the flow control panel in the interior of the nozzle.

7. An apparatus that adjusts a throat area of a nozzle, the apparatus comprising:
a nozzle having an interior surface, the interior surface extending around an interior of the nozzle, the nozzle having a forward end and an aft end, the nozzle having a flow direction through the interior of the nozzle from the forward end of the nozzle to the aft end of the nozzle, the nozzle having a throat cross-sectional area in the interior of the nozzle, the throat cross-sectional area being intermediate the forward end of the nozzle and the aft end of the nozzle;
an opening through the interior surface of the nozzle, the interior surface of the nozzle having a forward edge at a forward end of the opening and the interior surface of the nozzle having an aft edge at an aft end of the opening that is opposite the forward end of the opening, the interior surface having a first side edge at a first side of the opening and the interior surface having a second side edge at a second side of the opening, the first side of the opening being opposite the second side of the opening;
a flow control panel extending through the opening and into the interior of the nozzle, the flow control panel having a forward surface that opposes the forward edge of the interior surface with there being a forward gap between the forward surface and the forward edge;
an actuator device operatively connected to the flow control panel, the actuator device being operable to move the flow control panel between a first position of the flow control panel in the interior of the nozzle and a second position of the flow control panel in the interior of the nozzle where when the flow control panel is moved from the first position of the flow control panel in the interior of the nozzle to the second position of the flow control panel in the interior of the nozzle the flow control panel decreases the throat cross-sectional area and when the flow control panel is moved from the second position of the flow control panel in the interior of the nozzle to the first position of the flow control panel in the interior of the nozzle the flow control panel increases the throat cross-sectional area;
as the flow control panel is moved between the first position of the flow control panel in the interior of the nozzle and the second position of the flow control panel in the interior of the nozzle a dimension of the forward gap between the forward surface of the flow control panel and the forward edge of the interior surface of the nozzle remains constant;
the flow control panel having an aft surface that opposes the aft edge of the interior surface of the nozzle with there being an aft gap between the aft surface and the aft edge;
as the flow control panel is moved between the first position of the flow control panel in the interior of the nozzle and the second position of the flow control panel in the interior of the nozzle a dimension of the aft gap between the aft surface of the flow control panel and the aft edge of the interior surface remains constant;

the actuator device moves the flow control panel about a rotation axis as the actuator device moves the flow control panel between the first position of the flow control panel in the interior of the nozzle and the second position of the flow control panel in the interior of the nozzle; and, the forward surface of the flow control panel has a cross-sectional configuration that defines an arc having a constant radius of curvature from the rotation axis.

8. The apparatus of claim 7, further comprising:
the aft surface of the flow control panel has a cross-sectional configuration that defines an arc having a constant radius of curvature relative to the rotation axis.

9. An apparatus that adjusts a throat area of a nozzle, the apparatus comprising:
a nozzle having an interior surface, the interior surface extending around an interior of the nozzle, the nozzle having a forward end and an aft end, the nozzle having a flow direction through the interior of the nozzle from the forward end of the nozzle to the aft end of the nozzle, the nozzle having a throat cross-sectional area in the interior of the nozzle, the throat cross-sectional area being intermediate the forward end of the nozzle and the aft end of the nozzle;
an opening through the interior surface of the nozzle, the interior surface having a forward edge at a forward end of the opening and the interior surface having an aft edge at an aft end of the opening that is opposite the forward edge, the interior surface having a first side edge at a first side of the opening and the interior surface having a second side edge at a second side of the opening that is opposite the first side edge of the interior surface;
a flow control panel extending through the opening and into the interior of the nozzle, the flow control panel having a forward surface that opposes the forward edge of the interior surface of the nozzle, the flow control panel having an aft surface that opposes the aft edge of the interior surface of the nozzle, the flow control panel having a throat surface between the forward surface and the aft surface of the flow control panel, the throat surface being positioned in the interior of the nozzle and defining the throat cross-sectional area in the interior of the nozzle;
an actuator device operatively connected to the flow control panel, the actuator device being operable to move the flow control panel between a first position of the flow control panel in the interior of the nozzle and a second position of the flow control panel in the interior of the nozzle where when the actuator device moves the flow control panel from the first position of the flow control panel in the interior of the nozzle to the second position of the flow control panel in the interior of the nozzle the flow control panel decreases the throat cross-sectional area and when the actuator device moves the flow control panel from the second position of the flow control panel in the interior of the nozzle to the first position of the flow control panel in the interior of the nozzle the flow control panel increases the throat cross-sectional area;
the actuator device is operable to rotate the flow control panel about a rotation axis as the actuator device moves the flow control panel between the first position of the flow control panel in the interior of the nozzle and the second position of the flow control panel in the interior of the nozzle;
the rotation axis is positioned on an opposite side of the flow control panel from the throat cross-sectional area;
the actuator device moves the flow control panel about the rotation axis as the actuator device moves the flow control panel between the first position of the flow control panel in the interior of the nozzle and the second position of the flow control panel in the interior of nozzle; and,
the forward surface of the flow control panel has a cross-sectional configuration that defines an arc having a constant radius of curvature from the rotation axis.

10. The apparatus of claim 9, further comprising:
a forward gap between the forward surface of the flow control panel and the forward edge of the interior surface of the nozzle; and,
the dimension of the forward gap providing a seal against passage of hot gasses through the forward gap.

11. The apparatus of claim 10, further comprising:
no part of the nozzle extends across the forward gap.

12. The apparatus of claim 10, further comprising:
as the flow control panel is moved between the first position of the flow control panel in the interior of the nozzle and the second position of the flow control panel in the interior of the nozzle, the dimension of the forward gap between the forward surface of the flow control panel and the forward edge of the interior surface of the nozzle remains constant.

13. The apparatus of claim 10, further comprising:
an aft gap between the aft surface of the flow control panel and the aft edge of the interior surface of the nozzle; and,
as the flow control panel is moved between the first position of the flow control panel in the interior of the nozzle and the second position of the flow control panel in the interior of the nozzle, a dimension of the aft gap between the aft surface of the flow control panel and the aft edge of the interior surface of the nozzle remains constant.

14. The apparatus of claim 13, further comprising:
the flow control panel having a first side edge that extends along the forward surface, the throat surface and the aft surface of the flow control panel, the first side edge of the flow control panel opposes the first side edge of the interior surface of the nozzle with there being a first side gap between the first side edge of the flow control panel and the first side edge of the interior surface of the nozzle, the flow control panel having a second side edge that extends along the forward surface, the throat surface and the aft surface of the flow control panel, the second side edge of the flow control panel opposes the second side edge of the interior surface of the nozzle with there being a second side gap between the second side edge of the flow control panel and the second side edge of the interior surface of the nozzle; and,
as the flow control panel is moved between the first position of the flow control panel in the interior of the nozzle and the second position of the flow control panel in the interior of the nozzle a dimension of the first side gap between the first side edge of the flow control panel and the first side edge of the interior surface of the nozzle remains constant and a dimension of the second side gap between the second side edge of the flow control panel and the second side edge of the interior surface of the nozzle remains constant.

15. The apparatus of claim 13, further comprising:
the flow control panel having a forward edge along the forward surface and the flow control panel having an aft edge along the aft surface;
the forward edge of the flow control panel moves toward the forward edge of the interior surface of the nozzle and the aft edge of the flow control panel moves away from the aft edge of the interior surface of the nozzle in response to the flow control panel being moved from the first position of the flow control panel in the interior of the nozzle to the second position of the flow control panel in the interior surface of the nozzle; and,
the forward edge of the flow control panel moves away from the forward edge of the interior surface of the nozzle and the aft edge of the flow control panel moves toward the aft edge of the interior surface of the nozzle in response to the flow control panel being moved from the second position of the flow control panel in the interior surface of the nozzle to the first position of the flow control panel in the interior of the nozzle.

16. An apparatus that adjusts a throat area of a nozzle, the apparatus comprising:
a nozzle having an interior surface, the interior surface extending around an interior of the nozzle, the nozzle having a forward end and an aft end, the nozzle having a flow direction through the interior of the nozzle from the forward end of the nozzle to the aft end of the nozzle, the nozzle having a throat cross-sectional area in the interior of the nozzle, the throat cross-sectional area being intermediate the forward end of the nozzle and the aft end of the nozzle;
an opening through the interior surface of the nozzle, the interior surface having a forward edge at a forward end of the opening and the interior surface having an aft edge at an aft end of the opening that is opposite the forward edge, the interior surface having a first side edge at a first side of the opening and the interior surface having a second side edge at a second side of the opening that is opposite the first side edge of the interior surface;
a flow control panel extending through the opening and into the interior of the nozzle, the flow control panel having a forward surface that opposes the forward edge of the interior surface of the nozzle, the flow control panel having an aft surface that opposes the aft edge of the interior surface of the nozzle, the flow control panel having a throat surface between the forward surface and the aft surface of the flow control panel, the throat surface being positioned in the interior of the nozzle and defining the throat cross-sectional area in the interior of the nozzle;
an actuator device operatively connected to the flow control panel, the actuator device being operable to move the flow control panel between a first position of the flow control panel in the interior of the nozzle and a second position of the flow control panel in the interior of the nozzle where when the actuator device moves the flow control panel from the first position of the flow control panel in the interior of the nozzle to the second position of the flow control panel in the interior of the nozzle the flow control panel decreases the throat-cross sectional area and when the actuator device moves the flow control panel from the second position of the flow control panel in the interior of the nozzle to the first position of the flow control panel in the interior of the nozzle the flow control panel increases the throat cross-sectional area;

the actuator device is operable to rotate the flow control panel about a rotation axis as the actuator device moves the flow control panel between the first position of the flow control panel in the interior of the nozzle and the second position of the flow control panel in the interior of the nozzle;
the rotation axis is positioned on an opposite side of the flow control panel from the throat cross-sectional area;
a forward gap between the forward surface of the flow control panel and the forward edge of the interior surface of the nozzle;
the dimension of the forward gap providing a seal against passage of hot gasses through the forward gap;
an aft gap between the aft surface of the flow control panel and the aft edge of the interior surface of the nozzle;
as the flow control panel is moved between the first position of the flow control panel in the interior of the nozzle and the second position of the flow control panel in the interior of the nozzle, a dimension of the aft gap between the aft surface of the flow control panel and the aft edge of the interior surface of the nozzle remains constant;
the actuator device moves the flow control panel about a rotation axis as the actuator device moves the flow control panel between the first position of the flow control panel in the interior of the nozzle and the second position of the flow control panel in the interior of the nozzle; and,
the forward surface of the flow control panel has a cross-sectional configuration that defines an arc having a constant radius of curvature from the rotation axis.

17. The apparatus of claim 16, further comprising:
the aft surface of the flow control panel has a cross-sectional configuration that defines an arc having a constant radius of curvature relative to the rotation axis.

18. An apparatus that adjusts a throat area of a nozzle, the apparatus comprising:
a nozzle having an interior surface, the interior surface extending around an interior of the nozzle, the nozzle having a forward end and an aft end, the nozzle having a flow direction through the interior of the nozzle from the forward end of the nozzle to the aft end of the nozzle, the nozzle having a throat cross-sectional area in the interior of the nozzle, the throat cross-sectional area being intermediate the forward end of the nozzle and the aft end of the nozzle;
an opening through the interior surface of the nozzle, the interior surface having a forward edge at a forward end of the opening and the interior surface having an aft edge at an aft end of the opening that is opposite the forward edge, the interior surface having a first side edge at a first side of the opening and the interior surface having a second side edge at a second side of the opening that is opposite the first side edge of the interior surface;
a flow control panel extending through the opening and into the interior of the nozzle, the flow control panel having a forward surface that opposes the forward edge of the interior surface of the nozzle, the flow control panel having an aft surface that opposes the aft edge of the interior surface of the nozzle, the flow control panel having a throat surface between the forward surface and the aft surface of the flow control panel, the throat surface being positioned in the interior of the nozzle and defining the throat cross-sectional area in the interior of the nozzle;

an actuator device operatively connected to the flow control panel, the actuator device being operable to move the flow control panel between a first position of the flow control panel in the interior of the nozzle and a second position of the flow control panel in the interior of the nozzle where when the actuator device moves the flow control panel from the first position of the flow control panel in the interior of the nozzle to the second position of the flow control panel in the interior of the nozzle the flow control panel decreases the throat cross-sectional area and when the actuator device moves the flow control panel from the second position of the flow control panel in the interior of the nozzle to the first position of the flow control panel in the interior of the nozzle the flow control panel increases the throat cross-sectional area;

the actuator device is operable to rotate the flow control panel about a rotation axis as the actuator device moves the flow control panel between the first position of the flow control panel in the interior of the nozzle and the second position of the flow control panel in the interior of the nozzle;

a portion of the forward surface of the flow control panel having a cross-sectional configuration of an arc, the portion of the forward surface of the flow control panel having the cross-sectional configuration of an arc having a constant radius of curvature from the rotation axis; and, a portion of the aft surface of the flow control panel having a cross-sectional configuration of an arc, the portion of the aft surface of the flow control panel having the cross-sectional configuration of an arc having a constant radius of curvature from the rotation axis.

19. The apparatus of claim 18, further comprising:

the aft edge of the interior surface of the nozzle at the aft end of the opening through the interior surface of the nozzle is comprised of a plurality of triangular sections of the aft edge that extend across the interior surface of the nozzle.

20. The apparatus of claim 19, further comprising:

the aft surface of the flow control panel being formed with a plurality of ridges having triangular cross-sections.

\* \* \* \* \*